(12) United States Patent
Bray et al.

(10) Patent No.: US 6,517,774 B1
(45) Date of Patent: Feb. 11, 2003

(54) HIGH DENSITY COMPOSITE MATERIAL

(75) Inventors: Alan V. Bray, Austin, TX (US); Brian A. Muskopf, Austin, TX (US); Michael L. Dingus, Austin, TX (US)

(73) Assignee: Ideas to Market, L.P., Austin, TX (US)

( * ) Notice: Subject to any disclaimer, the term of this patent is extended or adjusted under 35 U.S.C. 154(b) by 0 days.

(21) Appl. No.: 09/454,899

(22) Filed: Dec. 3, 1999

Related U.S. Application Data

(62) Division of application No. 08/884,001, filed on Jun. 27, 1997, now Pat. No. 6,048,379.
(60) Provisional application No. 60/020,914, filed on Jun. 28, 1996.

(51) Int. Cl.⁷ .................................. B22F 1/00
(52) U.S. Cl. ................. 419/65; 419/5; 419/23
(58) Field of Search .................. 419/23, 5, 65

(56) References Cited

U.S. PATENT DOCUMENTS

| | | |
|---|---|---|
| 2,748,099 A | 5/1956 | Bruner et al. |
| 3,256,442 A | 6/1966 | Sedlak |
| 3,456,769 A | 7/1969 | Prichard et al. |
| 3,533,759 A | 10/1970 | Hittman |
| 3,536,920 A | 10/1970 | Sedlak et al. |
| 3,546,769 A | 12/1970 | Schwope et al. |
| 3,785,293 A | 1/1974 | Barr et al. |
| 3,895,143 A | 7/1975 | Tarlow |
| 4,027,594 A | 6/1977 | Olin et al. |
| 4,124,665 A | 11/1978 | Petersen et al. |
| 4,180,538 A | 12/1979 | Morikawa et al. |
| 4,259,112 A | 3/1981 | Dolowy, Jr. et al. |
| 4,271,114 A | 6/1981 | Ohno |
| 4,428,295 A | 1/1984 | Urs |
| 4,466,330 A | 8/1984 | Juretzek et al. |
| 4,603,637 A | 8/1986 | Snide et al. |
| 4,660,119 A | 4/1987 | Kato et al. |
| 4,674,409 A | 6/1987 | Lopata et al. |
| 4,714,023 A | 12/1987 | Brown |
| 4,780,981 A | 11/1988 | Hayward et al. |
| 4,833,334 A | 5/1989 | Valy et al. |
| 4,863,652 A | 9/1989 | Chang et al. |
| 4,891,399 A | 1/1990 | Ohkawa et al. |
| 4,921,540 A | 5/1990 | Gawol et al. |
| 4,949,645 A | 8/1990 | Hayward et al. |
| 5,026,512 A | 6/1991 | Chang et al. |
| 5,081,786 A | 1/1992 | Cobb |
| 5,088,415 A | 2/1992 | Huffman et al. |
| 5,122,418 A | 6/1992 | Nakane et al. |
| 5,127,322 A | 7/1992 | Kobler |
| 5,127,332 A | 7/1992 | Corzine et al. |
| 5,131,827 A | 7/1992 | Tasaka |
| 5,163,896 A | 11/1992 | Suthanthiran et al. |
| 5,189,252 A | 2/1993 | Huffman et al. |
| 5,228,694 A | 7/1993 | Okumoto et al. |
| 5,237,930 A | 8/1993 | Bélanger et al. |
| 5,264,022 A | 11/1993 | Haygarth et al. |
| 5,280,086 A | 1/1994 | Kawamoto et al. |

(List continued on next page.)

FOREIGN PATENT DOCUMENTS

| | | |
|---|---|---|
| GB | 2 179 664 A | 3/1987 |
| JP | 61091254 | 5/1986 |
| JP | 61097356 | 5/1986 |
| JP | 62079259 | 4/1987 |
| JP | 63273664 | 11/1988 |
| WO | WO 92/08346 | 5/1992 |

Primary Examiner—Daniel J. Jenkins
(74) Attorney, Agent, or Firm—Jenkens & Gilchrist, P.C.

(57) ABSTRACT

The present invention is related to a family of materials that may act as a replacement for lead in applications where the high density of lead is important, but where the toxicity of lead is undesirable. The present invention more particularly provides a high density material comprising tungsten, fiber and binder. Methods and compositions of such materials and applications thereof are disclosed herein.

9 Claims, 21 Drawing Sheets

U.S. PATENT DOCUMENTS

| | | |
|---|---|---|
| 5,300,048 A | 4/1994 | Drewes, Jr. et al. |
| 5,316,820 A | 5/1994 | Harpell et al. |
| 5,324,816 A | 6/1994 | Khanna et al. |
| 5,376,426 A | 12/1994 | Harpell et al. |
| 5,380,774 A | 1/1995 | Mulholland |
| 5,399,187 A | 3/1995 | Mravic et al. |
| 5,413,048 A | 5/1995 | Werner et al. |
| 5,416,333 A | 5/1995 | Greenspan |
| 5,418,056 A | 5/1995 | Noguchi et al. |
| 5,496,918 A | 3/1996 | Khanna et al. |
| 5,516,107 A | 5/1996 | Okumoto et al. |
| 5,527,376 A | 6/1996 | Amick et al. |
| 5,548,125 A | 8/1996 | Sandbank |
| 5,616,642 A | 4/1997 | West et al. |
| 5,632,790 A | 5/1997 | Wiand |
| 5,655,976 A | 8/1997 | Rife |
| 5,665,808 A | 9/1997 | Bilsbury et al. |
| 5,719,352 A | 2/1998 | Griffin |
| 5,730,664 A | 3/1998 | Asakura et al. |
| 5,738,653 A | 4/1998 | Pinchuk et al. |

HIGH DENSITY COMPOSITE MATERIAL

This application is a divisional application of U.S. application Ser. No. 08/884,001, filed Jun. 27, 1997 now U.S. Pat. No. 6,048,379 and claims priority to provisional application No. 60/020,914 filed Jun. 28, 1996.

The government may own certain rights in the present invention pursuant to United States Army contract number DAAE 30-95-C-0021.

BACKGROUND OF THE INVENTION

The present application is a continuation-in-part of co-pending Provisional U.S. patent application Ser. No. 60/020,914 filed Jun. 28, 1996. The entire text of the above-referenced disclosure is specifically incorporated by reference herein without disclaimer.

1. Field of the Invention

The present invention relates generally to the fields of polymers and high density compositions. More particularly, it concerns materials that may act as a replacement for lead in applications requiring lead's high density, but where the toxic effects of lead are undesirable. Further, the high density composites of the present invention may be employed in any application where a high density material is required.

2. Description of Related Art

Each year, approximately 689 million rounds of small arms ammunition (.22 caliber through .50 caliber) are fired during training by the Army, Navy, Air Force, Marine Corps, National Guard, and Reserves in the United States. An additional 10 million rounds are fired annually by the Department of Energy. The ammunition projectiles used for this training consist of lead antimony cores, or cores, encased in a copper alloy jacket. Use of these projectiles results in approximately 2,000 tons of lead per year being introduced into the environment. Lead contamination of soil, sediments, surface and groundwater have been confirmed through investigations conducted at Army, Navy, Air Force, Marine Corps, Coast Guard and private small arms ranges throughout the United States and Europe. Lead uptake in vegetation at a Marine Corps small arms range in Quantico, Virginia showed lead levels as high as 23,200 parts per million. Remediation of contaminated ranges has proven to be extremely expensive and provides only a temporary solution. The Navy reports hazardous waste removal from one small arms firing berm cost $2.5 million with an additional $100,000 per year required for lead contamination monitoring. Sixteen Navy small arms firing ranges are now required to improve hazardous waste maintenance at a predicted cost of $37.2 million. In addition, the September 1995 "Cost Analysis for Munitions Rule" prepared by the U.S. Army Concepts Analysis Agency indicate the cost to remediate an outdoor small arms range is approximately $150,000 per acre. Currently there are 120 ranges closing or scheduled to be closed as a result of Base Realignment and Closure recommendations which account for an estimated 4,185 acres or a total of $627 million.

In order for firing ranges to remain open, expensive cleanup procedures must be employed that provide only a temporary solution to the problem. A non-toxic, lead-free, environmentally safe, cost effective replacement projectile core material is required to enable firing ranges to remain open and to eliminate costly cleanup procedures. The density of the projectile should be close to that of a lead projectile for realistic performance simulation. Materials of a lower density decrease projectile range and penetration.

In addition, there is mounting concern over the use of lead shot for bird hunting, due to ingestion of the shot by birds and other animals as well as contamination of wetland areas. Indeed there has been legislation in the United States and other countries which bans the use of lead shots in waterfowl shots. Moreover, such a lead substitute or high density material will find many other applications, such as for weights, acoustic dampening or vibration dampening, and in radiation shielding applications, including protective clothing, medical clothing and clothing for use in nuclear reactors.

SUMMARY OF THE INVENTION

The present invention, in a general and overall sense, concerns a family of materials that may act as a replacement for lead in applications where the high density of lead is important, but where the toxicity of lead is undesirable. Thus there is presented in a particular aspect a high density composite for use in applications in which lead or any other high density material may be required.

Thus in a particular embodiment, there is provided a high density composition of matter, comprising tungsten powder, a fiber and a binder material. In particular embodiments, the tungsten comprises between about 5% and about 95% of the composite. In other embodiments, the tungsten comprises between about 10% and about 80% of the composite. In other embodiments, the tungsten comprises between about 15% and about 70% of the composite. In alternate embodiments, the tungsten comprises between about 25% and about 50% of the composite. In other embodiments, the tungsten comprises between about 35% and about 40% of the composite. Of course these are exemplary percentages and the tungsten may comprise any percentage between these figures, for example, about 5%, 6%, 7%, 8%, 9%, 12%, 14%, 16%, 20%, 21%, 22%, 23%, 24%, 26%, 28%, 30%, 32%, 34%, 36%, 38%, 42%, 44%, 46%, 48% 52%, 54%, 56%, 58%, 60%, 62%, 64%, 66%, 68%, 72%, 74%, 76%, 78%, 82%, 84%, 86%, or 88% of the composite weight.

In other aspects of the present invention the tungsten powder particle size is between about 2 and about 40 microns in diameter. In an alternative embodiment the tungsten powder particle size is between about 4 and about 8 microns in diameter. In yet another embodiment, the tungsten powder particle size is between about 20 and about 40 microns diameter. Of course these are exemplary measurements and the powder may comprise a particle size of about 4, 5, 6, 7, 9, 10, 11, 12, 14, 16, 18, 21, 22, 23, 24, 25, 28, 30, 31, 32, 33, 34, 35, 36, 37, 38 or 39 microns in diameter. In certain embodiments, it may be desirable to have tungsten powder comprised of particles having varying sizes of diameter. In other embodiments, the powder may be comprised of particles of uniform size of diameter.

In a particular embodiment of the present invention, the fiber may comprise stainless steel, copper, aluminum, nylon, Kevlar®, Spectra®, nickel, glass or carbon. In more particular aspects, the fiber is stainless steel fiber. In preferred embodiments, the fiber comprises between about 3% and about 30% of the composite weight. In other aspects the fiber comprises between about 10% and about 20% of the composite weight.

In alternate embodiments, the fiber comprises between about 15% and about 18% of the composite weight. Of course these are exemplary percentages and the fiber may comprise any percentage between these figures, for example, about 4%, 5%, 6%, 7%, 8%, 9%,10%, 12%, 14%, 16%, 19%, 21%, 22%, 23%, 24%, 25%, 26%, 27%, 28%, or 29% of the composite weight.

In yet another aspect of the present invention the binder is a polymeric binder. In particular aspects the polymeric binder may be selected from the group consisting of cellulose, fluoro-polymer, ethylene inter-polymer alloy elastomer, ethylene vinyl acetate, ionomer, nylon, polythermide, polyester elastomer, polyester sulfone, polyphenyl amide, polypropylene, polyvinylidene fluoride or thermoset polyurea elastomer.

In more particular embodiments, the polymeric binder is Nylon 12® and polyester elastomer. In more specific embodiments the polymeric binder comprises between about 1% to about 30% weight ratio of the composite. In other embodiments, the polymeric binder is at a concentration of about 2% to about 20% weight ratio. In still further embodiments, the polymeric binder comprises between about 5% to about 15% weight ratio of the composite. In other embodiments, the polymeric binder comprises between about 8% to about 12% weight ratio of the composite.

The present invention further provides a high density plastic composition comprising a mixture of a base metal powder, fiber and binder. In particular embodiments, the base metal powder may be osmium, iridium, platinum, rhenium, tungsten, gold, tantalum, rhodium, palladium, thallium, silver, molybdenum, bismuth, copper, cobalt, nickel, cadmium, niobium and iron. In particular embodiments the high density composition may be utilized as a radiation shielding material. In other embodiments, the radiation shielding material is a flexible shielding material. In further embodiments, the composition may be utilized as modeling weights, fishing weights, flywheels, or projectiles.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better is understood by reference to one or more of these drawings in combination with the detailed description of specific embodiments presented herein.

DESCRIPTION OF ILLUSTRATIVE EMBODIMENTS

Figure 1:
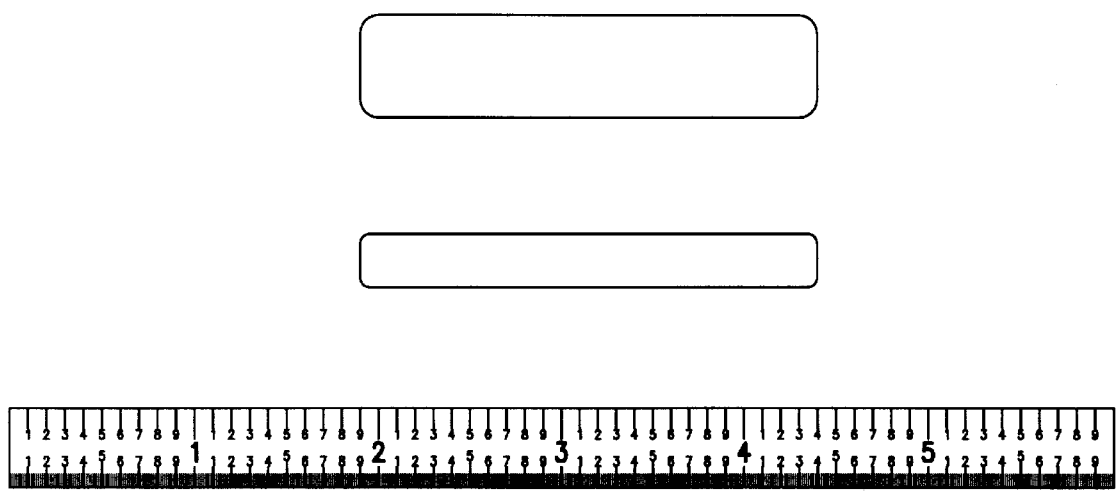
FIG. 1 shows a picture of compression molded tungsten powder/polymeric binder flexural test bars.

Lead from spent lead bullets represents a major source of environmental pollution as well as posing a potential health risk to both shooters and range personnel alike. Lead bullet residue left in the earthen berms of outdoor ranges can leach into the soil and contaminate water tables. Indoor ranges require extensive and expensive air filtration systems to operate safely as lead is introduced into the atmosphere as the projectile exits the barrel. Improved bullet traps are also required to permit lead collection and recycling. Outdoor ranges require constant soil remediation.

The present invention provides compositions that may be used as lead substitutes, having a density similar to or greater than lead and being substantially less toxic to the user. The compositions of the present invention thus provide a new, relatively non-toxic, high performance replacement for metallic lead that can play a part in the ongoing transition from environmentally hazardous materials to ecologically acceptable ones. The compositions of the present will be useful not only in the manufacture of ammunitions but also in any applications requiring the use of a high density material. For example, the materials are useful as weights, such as counterweights, fishing weights, wheel weights, flywheels or for use in model applications, such as in model railroading. Other similar applications include use as an acoustic dampening or vibration dampening material. Also, the high density material will find use in radiation shielding applications, for example, in radiotherapy and routine X-ray examinations and those applications requiring a radiation shielding compound that may be placed in small spaces, such as cracks. As defined herein "high density" refers to a density that is near to or higher than the density of lead.

As stated earlier, the compositions of the present invention may be used in the manufacture of practice ammunition for all types of rifles and pistols. If the lead-free projectiles are also frangible, they have applications when ricochet poses a danger to innocent parties. Applications for frangible non-toxic projectiles includes indoor/outdoor firing ranges; police and military training and qualification; commercial institutions; industrial installations; banks; prisons/jails; nuclear power plants; chemical processing plants; hospitals; and universities.

The non-toxic projectile core technology of the present invention may be used to replace lead shotgun pellets, now prohibited for use in waterfowl hunting. The tungsten-based pellets will have similar performance to lead shot, unlike steel shot that is currently being used as a replacement for lead shot. Bismuth is also used, but this material is not as dense as lead, making it an undesirable material in lead shot replacement. Rifled slugs for shotguns and air rifle pellets may also be manufactured utilizing the non-toxic tungsten formulations according to the present invention.

Further, the compounds may be formed into sheets or blocks useful in radiation shielding applications. Also it is contemplated that the high density materials of the present invention can be machined to form complex shields, housings or assemblies. Other radiation shielding applications include use in clothing worn by personnel exposed to radiation sources. Such dense, and non-toxic materials may further be formulated to be flexible and will find applications in protective clothing and other protective gear for medical and dental personnel, persons involved in the nuclear power or defense industries, and any other application where such clothing or apparel is worn. Lead is a soft, toxic and structurally weak metal and is therefore unsuitable for certain such applications.

The material may be injection or compression molded into a variety of shapes. Injection molding fabrication using the material allows for high volume, low cost fabrication. Products utilizing the high density materials of the present invention may also be fabricated using thermoset and thermoplastic extrusion, thermoset and thermoplastic pultrusion, compression, centrifugal molding, rotational molding, blow molding, casting, calendering, liquid fill thermoset molding or filament winding to form a variety of shapes.

The material of the present formulations comprises a tungsten powder as a high density component. Tungsten powder is relatively non-toxic and is suitable for commercial applications. Because solid metallic tungsten is a very hard material and melts at an extremely high temperature (approx. 3410° C., the highest melting point of all metals), the present formulations allows injection and compression molding and other previously mentioned methods, thus avoiding difficulties that may be encountered with working with pure tungsten.

A novel aspect of the present formulations is the use of fibers to form a composite material comprising tungsten powder, polymeric binders, and fibers. The fibers may be stainless steel, or other metallic fibers such as copper, nickel, niobium, or titanium. Alternatively, non-metallic fibers, such as glass fibers, Kevlar®, Spectra®, graphite, carbon, or boron, may be used to increase the tensile strength of the composition. It is possible to enhance the physical properties of the composition by adding various fibers, either singly or in combination with each other. For example, use of fibers softer than steel, such as glass, cellulose, cotton, nickel or copper fibers, may result in reduction of barrel wear in projectile applications.

Another aspect of the invention is the use of thermoplastic and thermoset materials as a polymeric binder. Each type of binder may be used to vary the physical properties of the composite, for example from very hard to soft and flexible. As used herein, "TPP" means tungsten powder/polymeric binder composite materials. In certain embodiments, the binder may be a hot melt or thermosetting type of glue. In particular embodiments, the thermoset may comprise a single component whereas in other embodiments, the thermosets comprise a plurality of components.

The properties of the composition may be varied as well by the use of tungsten powders of different particle sizes. A composition may comprise a powder of a single particle size, or the composition may comprise a tungsten powder blend with a distribution of different particle sizes.

In certain aspects, equal portions of a tungsten powder with size distributions of about 2–4 microns, about 4–8 microns, and about 20–40 microns which are mixed with fibers and polymeric binder. Stainless steel fibers are added, for example, at about 5% by volume with the composition to improve tensile strength.

As previously mentioned, the compositions of the present invention may be used as ionizing radiation shielding that is relatively non-toxic and easy to apply. In this aspect, tungsten powder is mixed with the bulk component of a two-part curing resin system, such as an epoxy resin. The resultant mixture, having the viscosity of a caulking compound, is easily stored until ready for use. Prior to application, a catalyst is added and the mixture is thoroughly stirred. The material may then be applied to any surface, for example into cracks, and allowed to cure. The resulting cured material could, for example, then serve as a patch for radiation leaks in a radiation shielding system. In other applications, the composition may be used as radiation shielding in clinical applications, for example to form shields for use in radiation therapy procedures. Alternatively it will be possible to employ the compositions of the present invention in making aprons, gloves or other apparel and shields for use in applications such as, for example, X-ray examinations.

In other aspects, the formulations of the present invention are useful in making a lead-free projectile, which comprises, for example, a powder material that may be tungsten, tungsten carbide, ferrotungsten, and the like. The formulation also comprises a fiber material that may be, for example, stainless steel, copper, glass, zinc, and the like. Additionally, the formulation comprises a binder material that may be a two-part curing resin, such as epoxy resin, polyurethane or polyester resin, or other polymer material. One-component thermosets are often cure initiated by air or moisture.

In certain other aspects of the invention, methods are provided for molding articles of the present invention into a variety of shapes, including projectiles, shot, radiation shielding blocks, custom radiation shields with complex geometry, and the like. Also provided are methods of preparing the formulations into a putty-like consistency that may be applied into cracks or holes to block radiation passage. The compositions of the present invention and methods for making and using such compositions are described in further detail herein below.

Metal Powders

Table 1 presents a list of elemental metals that were considered as potential candidates for use as lead substitutes in high density compositions. From the list of metals with a specific gravity greater than lead, it is evident that tungsten meets the physical requirements of high density. Furthermore, tungsten has a low toxicity, making it an excellent metal of choice in lead substitutes and other high density materials.

TABLE 1

Potential Candidate Base Metals and Alloying Metals

| Elemental Metal | Specific Gravity |
| --- | --- |
| Potential Base Metals | |
| Osmium | 22.48 |
| Iridium | 22.42 |
| Platinum | 21.45 |
| Rhenium | 20.53 |
| Tungsten | 19.35 |
| Gold | 18.88 |
| Tantalum | 16.60 |
| Hafnium | 13.31 |
| Rhodium | 12.40 |
| Ruthenium | 12.30 |
| Palladium | 12.02 |
| Thallium | 11.85 |
| Lead | 11.43 |
| Potential Alloying Metals | |
| Silver | 10.50 |
| Molybdenum | 10.20 |

TABLE 1-continued

Potential Candidate Base Metals and Alloying Metals

| Elemental Metal | Specific Gravity |
| --- | --- |
| Bismuth | 9.80 |
| Copper | 8.92 |
| Cobalt | 8.90 |
| Nickel | 8.90 |
| Cadmium | 8.64 |
| Niobium | 8.57 |
| Iron | 7.86 |

The great advantage of tungsten as a lead substitute material is that, in addition to being comparatively non-toxic, it has a very high density (19.25 g/cc). Commercially available tungsten powders can therefore be mixed and pressed with softer and lighter non-toxic metals, such as tin or zinc, to generate lead substitute materials with a range of densities as high as, or even higher than, that of lead.

Of course, it will be possible to produce a high density composite material in accordance with the present invention by using any of the metals shown in Table 1. Particularly preferred is tungsten, but bismuth, copper, cobalt, tantalum, nickel, silver and so forth can also be used.

In certain instances, copper was found to have a number of advantages as a useful material. It is relatively non-toxic and is widely accepted by the shooting community through its extensive use as a jacketing metal for lead projectiles. Solid copper has a reasonably high density of 8.96 g/cc, which is about 80% of that of lead.

A survey of the periodic table of elements shows that metals with densities higher than copper (such as silver, gold, tungsten, bismuth) are considerably more expensive than copper and have previously been rejected as possible replacements for lead on grounds of affordability, however the methods and compositions of the present invention make these materials a useful and affordable alternative to lead and copper in some applications. Finally, the high melting and boiling points of copper ensure that very little of the copper metal will vaporize into an easily breathable form (so called copper fume) either at the firing point or on bullet impact with indoor range steel baffling on bullet traps.

Copper in the metallic and powder form is not a severe pollutant. It is widely used in military stores. Nearly all small arms cartridge cases are made from brass (an alloy of copper and zinc). Its excellent lubricating and flow characteristics also make it the metal of choice for jacketing lead cores in small arms bullets. The price of copper is also sufficiently high to ensure that brass cartridge cases are always either reused or recovered for scrap. Expended copper bullet jackets also have value and can be recovered and recycled as scrap copper, further assisting reclamation of waste materials and protection of the environment. Copper alloys such as brass and bronze can also be used to make bullets. These alloys are harder than copper and need to be pressed at higher pressures and sintered at lower temperatures.

Non-toxic metals such as zinc and tin are also potential candidates to replace lead but, being less dense than copper and tungsten, may suffer from problems arising from lower projectile mass such as compatibility with commercially available propellants, reliable cycling and feeding of weapons, realistic recoil energies and matching the trajectory of lead projectiles. However, the present invention circumvents this problem by providing methods of making composite materials that make the material more dense.

More volatile metals than copper, such as tin and zinc, are also prone to forming ingestible vapors at the high temperatures generated during bullet impact on steel plates.

Metals such as gold, silver, platinum and palladium also have densities that are close to or greater than the density of lead and would therefore, be suitable as materials for the composites of the present invention. The drawback with these metals is that they are expensive; however, the present invention combines metals of a high density with, for example, Nylon 11® or Nylon 12® in order to make such composites more cost effective. Further other non-metallic components may be used in combination with the disclosed compositions to form a material of the requisite density in a relatively cost effective manner. Such non-metallic components may include mineral ores for example, hematite.

In certain applications where projectiles are made, employing tungsten, or any of the other non-toxic metals listed herein as a component, it is possible to demonstrate a uniform blending of the metal powders, essential to ensure consistent projectiles and other articles described in the present invention. Furthermore, the composite projectiles match standard ball ammunition, both in weight and trajectory, over realistic training distances. Lead substitutes using tungsten powder as a component are frangible but they tend to be much more penetrating against metal plates than other metal loaded polymer projectiles.

Metal Fibers

In order to reduce the cost and add strength to a tungsten powder/polymeric binder composite material, the present inventors have added metal fibers at a low volume fraction. The inventors performed a survey to identify suitable metal fibers for use in a projectile core application. The metal fibers need to possess high strength, high specific gravity and have a low cost. The survey revealed that the most cost effective metal fibers with high strength and specific gravity are chopped stainless steel fibers. Stainless steel fibers are readily available and are currently being added to injection moldable polymer resins at up to a 30% volume ratio for electromagnetic shielding applications. Fiber made from 316 stainless steel with a length of 0.125 inches, a thickness of 75 microns, a specific gravity of 8.0 was selected as a representative tungsten powder/polymeric binder material additive. In other embodiments, any of the metals listed in Table 1, may further be formulated into fibers for use in the present invention.

Polymeric binders

Once tungsten was selected as the candidate metal powder, a survey was performed to identify potential polymeric binders for the tungsten powder. As used herein a "binder" is a material that is used to provide cohesion between the high density metal powder and the fibers such that the integrity of the metal and the fiber is maintained.

Table 2 presents a summary of selected properties for polymeric binders considered for mixing with tungsten powder. The selection criteria used to form this list of potential polymeric binder materials included good ductility (high elongation values), high strength, high modulus, high melting temperatures, high impact strength, low water absorption and low cost. The Nylon 6® and Nylon 6,6® resins were found to have high water absorption values. The polyethersulfone and polyphthalamide had low elongation values. The cellulose resin was retained even though it also has low elongation because it is a biodegradable projectile core material. After consulting with U.S. Army ARDEC engineering personnel, it was determined that all of these candidate materials should be chemically compatible with the cartridge propellants. All of the selected candidate polymer resins are injection molding grades except for the thermoset elastomer. The polyurea thermoset elastomer is a Texas Research Institute/Austin MDI/Polamine 1000 formulation. The Polamine 1000 polyurea elastomer formulation is prepared by mixing 38.02 g Dow 2143L (a modified diphenylmethane diisocyanate) and 150 g Polamine 1000 (an amine terminated polytetramethylene ether made by Air Products) with Teledyne C-8 tungsten powder for a final product density of 10.33 g/cc. This material is referred to hereinafter as "TRI/Austin MDI/Polamine 1000 formulation".

TABLE 2

Selected Properties of Candidate Binders

| Polymeric binder | Manufacturer (Grade) | Spec. Grav. | Melting Point (F.) | Heat Deflection Temp. at 263 psi (F.) | Tensile Strength (psi) | Elongation At Yield (%) | Elongation At Break (%) | Tensile Modulus (ksi) | Flexural Modulus (ksi) | Notched Izod Impact Strength (ft-lb/in) | Water Absorption at 24 hr. Immersion (%) |
|---|---|---|---|---|---|---|---|---|---|---|---|
| Cellulose Based | Planet Polymers (PT-C300ZT) | 1.29 | 360 | 125 | 6,182 | — | 11 | 338 | 413 | 1.3 | — |
| ECTFE Fluoropolymer | Ausimont (Halar 5001LC) | 1.68 | 460 | 153 | 6,600 | — | 260 | — | 242 | N.B. | 0.10 |
| Ethylene Interpolymer Alloy Elastomer | DuPont (ALCRYN 2070NC) | 1.20 | 365 | — | 1,200 | 9 | 375 | — | — | — | — |
| Ethylene-Vinyl Acetate Polymer | DuPont (ELVAX 360) | 0.95 | 415 | — | 2,600 | — | 800 | — | 3.7 | — | — |
| Ionomer | DuPont (Surlyn 8220) | 0.95 | 480 | — | 5,600 | — | 305 | — | 79 | N.B. | — |
| Nylon 6 ® | Hoechst Celenase (2800) | 1.13 | 419 | 147 | 11,400 | — | 80 | 435 | 395 | 1.1 | 1.70 |

TABLE 2-continued

Selected Properties of Candidate Binders

| Polymeric binder | Manufacturer (Grade) | Spec. Grav. | Melting Point (F.) | Heat Deflection Temp. at 263 psi (F.) | Tensile Strength (psi) | Elongation At Yield (%) | Elongation At Break (%) | Tensile Modulus (ksi) | Flexural Modulus (ksi) | Notched Izod Impact Strength (ft-lb/in) | Water Absorption at 24 hr. Immersion (%) |
|---|---|---|---|---|---|---|---|---|---|---|---|
| Nylon 6,6 ® | Hoechst Celanese (1000) | 1.14 | 495 | 190 | 11,000 | — | 300 | — | 420 | 2.1 | 1.50 |
| Nylon 11 ® | Atochem (BMFO) | 1.04 | 367 | 115 | 10,000 | — | 390 | — | 170 | — | 0.30 |
| Nylon 12 ® | EMS-American (Grilamide L20GHS) | 1.01 | 352 | 131 | 7,500 | 20 | 320 | — | 126 | 1.3 | 0.23 |
| Polythermide (PEI) | GE (Ultem 1000) | 1.27 | 675 | 392 | 15,200 | 7 | 60 | — | 480 | 1.0 | 0.25 |
| Polyester Elastomer | Bayer (Texin 480-A) | 1.20 | 385 | — | 6,000 | — | 500 | 1.7 | 4.5 | — | — |
| Polyestersulfone (PES) | BASF (Ultrason E1010) | 1.37 | 680 | — | 13,000 | — | 6.7 | 380 | — | 13.0 | 0.30 |
| Polyphtalamide (PPA) | AMOCO (Amodel ET-1001) | 1.15 | 590 | 248 | 11,000 | 6 | 30 | 350 | 380 | 18.0 | 0.68 |
| Polypropylene | AMOCO (ACCTUF 3434) | 0.91 | 450 | — | 4,000 | 9 | 500 | — | 200 | 3.4 | 0.03 |
| Polyvinylidene Flouride (PVDF) | Atisimont (Hylar 461) | 1.77 | 315 | 185 | 7,500 | — | 250 | 200 | 260 | 3.0 | 0.04 |
| Thermoset Polyurea Elastomer | TRIAustin (MDI/Polamine 1000) | — | — | — | 8,000 | — | 460 | 2.1 | — | — | — |

Methods of making projectiles, shielding devices and other applications described herein are well known to those of skill in the art. The skilled artisan is referred to U.S. Pat. No. 5,264,022; 5,399,187; 5,189,252; 4,949,645, and WO 9316349 for details on the use of alloys in the preparation of projectiles, each of the aforementioned publications is incorporated herein by reference. U.S. Pat. No. 5,081,786 and WO publication No. 9208346 (both incorporated herein by reference) describe methods of constructing fishing lures from metal alloys, such methods may be employed in combination with the compositions of the present invention. Methods of making radiological shielding devices and clothing or other apparel are well known to those of skill in the art.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE I

Material Testing

The material testing consisted of performing flexural three point bend tests on compression molded tungsten powder/ polymeric binder flexural test bars and performing tensile tests on injection molded tungsten powder (and stainless steel fiber) polymeric binder tensile test bars. The flexural testing was used to screen the large number of candidate polymer mixtures and to select several optimal materials for injection molding. The tensile testing was performed to compare the material properties of each candidate injection molded composite mixture and lead.

Flexural Testing

Eleven candidate thermoplastic polymeric binders were successfully mixed with tungsten powder in a Brabender mixer. Each polymeric binder was mixed with the tungsten powder in a 50% volume ratio (25 cc of tungsten powder and 25 cc of polymeric binder). The tungsten powder had an equal distribution of particle sizes ranging from about 2 to about 20 microns. Each of the tungsten powder/polymeric binder mixtures was removed from the Brabender mixer and ground into particles using a laboratory grinder. Each mixture was then compression molded into flexural test bars using a hydraulic compression molding machine. FIG. 1 shows a picture of compression molded tungsten powder/ polymeric binder flexural test bars. One thermoset polymeric binder (TRI/Austin MDI/Polamine 1000 formulation) was mixed with tungsten powder in a standard rotary mixer using a 50% volume ratio. The tungsten powder thermoset polymeric binder mixture was placed into a flat plate compression mold. The mold was put into a hydraulic compression molding machine and was allowed to cure overnight at room temperature under clamping pressure. Flexural test bars were punched from the flat plate using a flexural test bar stamping die. All of the flexural test bars had the following dimensions; 2.5 inch length by 0.5 inch width by 0.125 inch thickness. Table 3 provides the average measured specific gravity for each of the polymeric binders used. The flexural test bars had a specific gravity ranging from 10.00 to 10.63.

TABLE 3

Specific Gravity of Compression Molded Tungsten powder/polymeric binder Flexural Test Bars

| Polymeric binder | Specific Gravity |
| --- | --- |
| Biodegradable Cellulose (Planet Polymers PT-C300ZT) | 10.02 |
| ECTFE Flouropolymer (Ausimont Halar 5001LC) | 10.63 |
| Ethylene Interpolymer Alloy Elastomer (DuPont Alcryn 2070NC) | 10.15 |
| Ethylene - Vinyl Acetate Elastomer (DuPont Elvax 360) | 10.48 |
| Ionomer (DuPont Surlyn 8220) | 10.00 |
| Nylon 11 ® (Atochem BMFO) | 10.10 |
| Nylon 12 ® (EMS Grilamide L20GHS) | 10.08 |
| Polytherimide (G.E. Ultem 1000) | 10.43 |
| Polyester Thermoplastic Elastomer (Bayer Texin 480-A) | 10.43 |
| Polypropylene (AMOCO ACCTUF 3434) | 10.15 |
| Polyvinylidene Flouride (Ausimont Hylar 461) | 10.00 |
| Thermoset Polyurea (TRI/Austin MDI/Polamine 1000 Formulation) | 10.33 |

Figure 12:
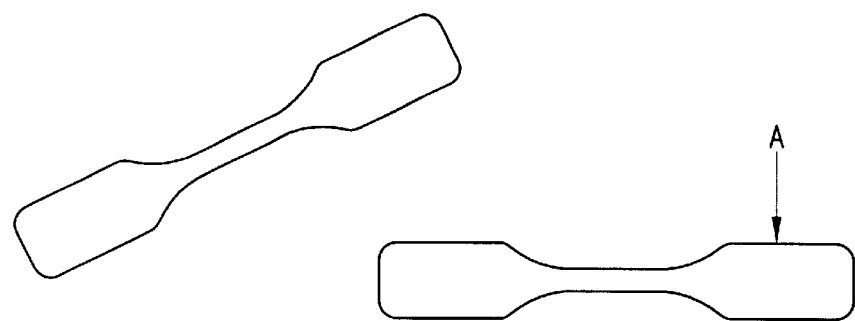
FIG. 12 shows a picture of the injection molded composite material tensile test bars. A-broken tensile test bar after tensile test.
Figure 12:
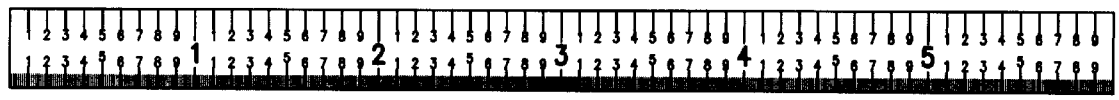

Tungsten powder/polymeric binder mixtures using the Nylon 12®(GRILAMIDE g L20GHS) and polyester thermoplastic elastomer (TEXIN 480A) resins were prepared in a Brabender mixer. 700 cc mixtures were prepared for each polymeric binder with a tungsten powder volume ratio of 54%. The tungsten powder had evenly distributed particle sizes ranging from 2 to 20 microns. An additional 700 cc mixture was also prepared for each polymeric binder by adding stainless steel fibers at a 10% volume ratio to the Nylon 12® tungsten powder/polymeric binder material. Each mixture was removed from the Brabender mixer and ground into particles using a grinder. Table 4 shows the volume and weight ratios for each mixture. ASTM D638 Type V "dogbone" tensile test bars (2.5 inch length by 0.125 inch width by 0.06 inch thickness) were injection molded from each mixture using a Master Precision Mold Test Specimen Four Cavity mold. FIG. 12 shows a picture of the injection molded composite material tensile test bars.

TABLE 4

Volume and Weight Ratios for Tensile Bar Composite Materials

| Mixture Constituent | GRILAMIDE L20GHS Nylon 12 ® | | TEXIN 480A Polyester Elastomer | | GRILAMIDE L20GHS Nylon 12 ® with Stainless Steel Fiber | |
| --- | --- | --- | --- | --- | --- | --- |
| | Volume Ratio (%) | Weight Ratio (%) | Volume Ratio (%) | Weight Ratio (%) | Volume Ratio (%) | Weight Ratio (%) |
| Tungsten Powder | 54.0 | 96.0 | 54.0 | 95.0 | 46.0 | 88.0 |
| Polymeric binder | 46.0 | 4.0 | 46.0 | 5.0 | 44.0 | 4.0 |
| Stainless Steel Fiber | — | — | — | — | 10.0 | 8.0 |

Figure 2:
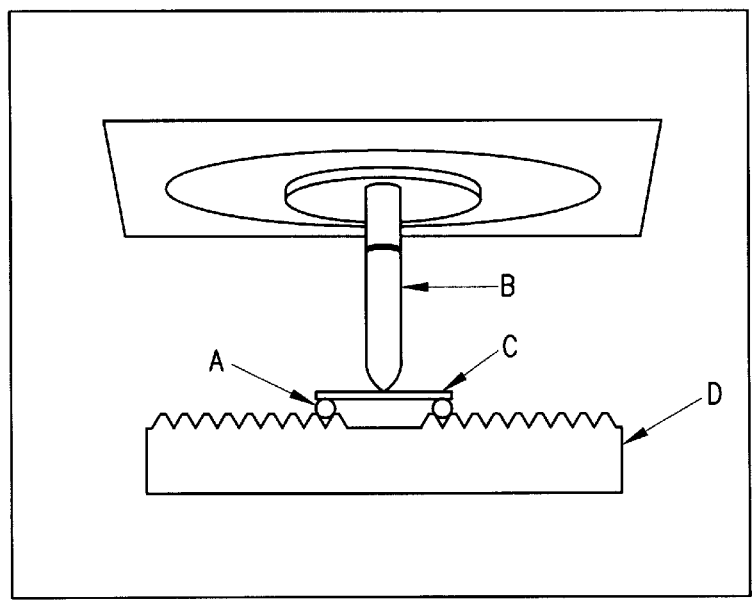
FIG. 2 shows a picture of the three point bend flexural test fixture and a flexural test bar installed in an Instron testing machine. A-support pins; B-center pin with cylindrical tap; C-flexural test bar; D-support base.
Figure 3:
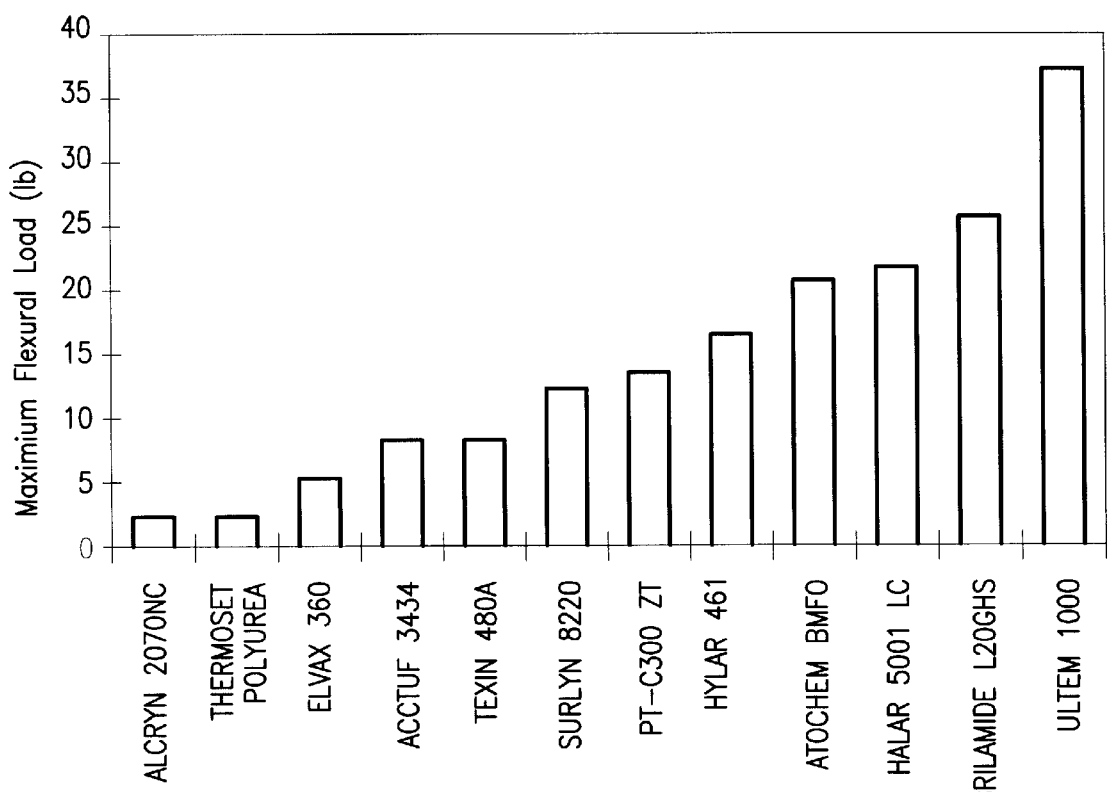
FIG. 3 shows the maximum flexural load (lb) for various polymeric binders.
Figure 4:
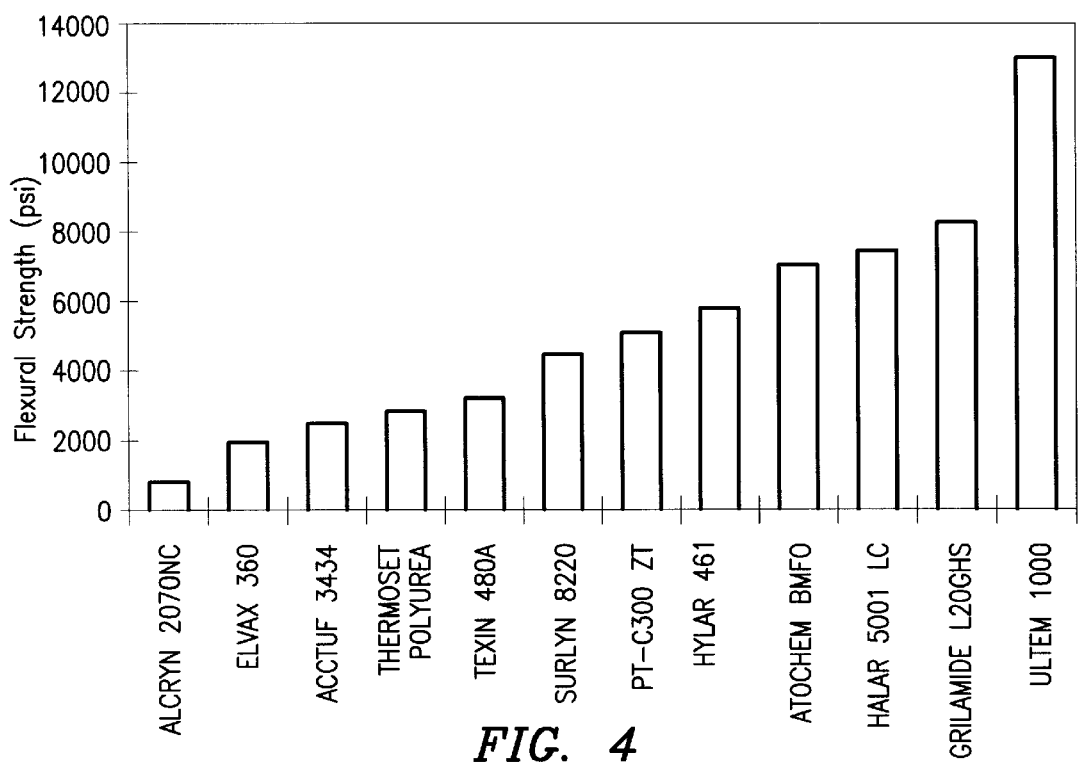
FIG. 4 shows the flexural strength (psi) for various polymeric binders.
Figure 5:
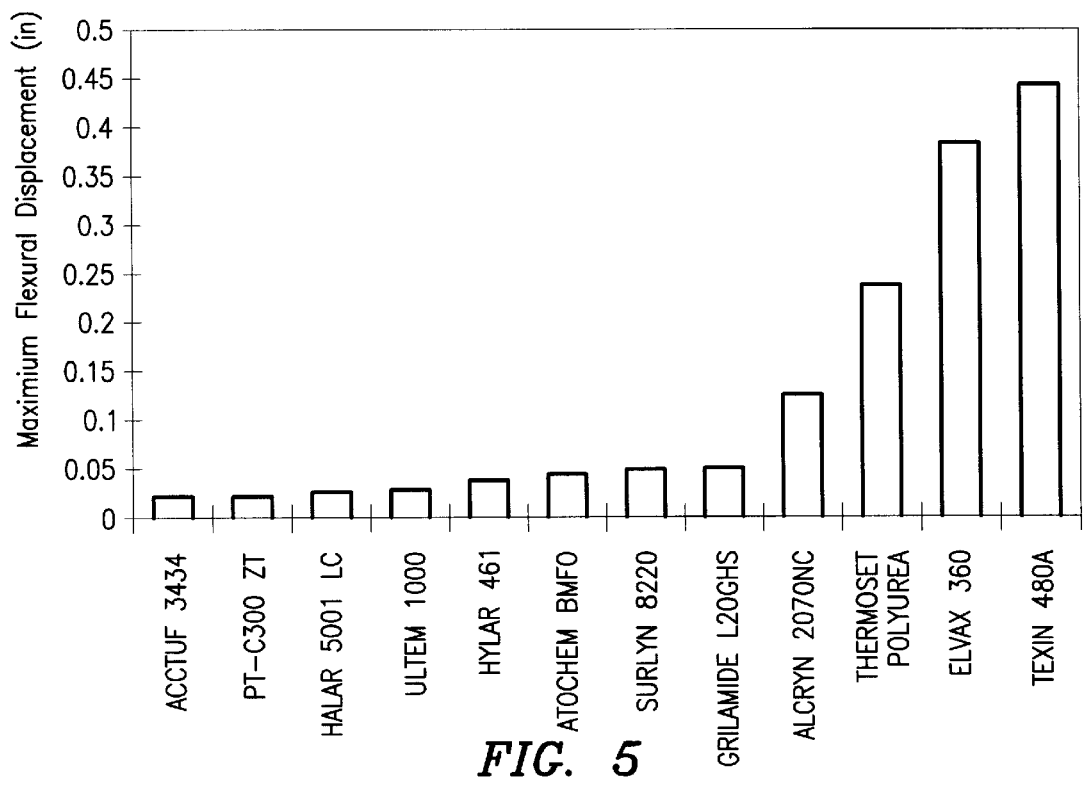
FIG. 5 shows the maximum flexural displacement (in.) for various polymeric binders.
Figure 6:
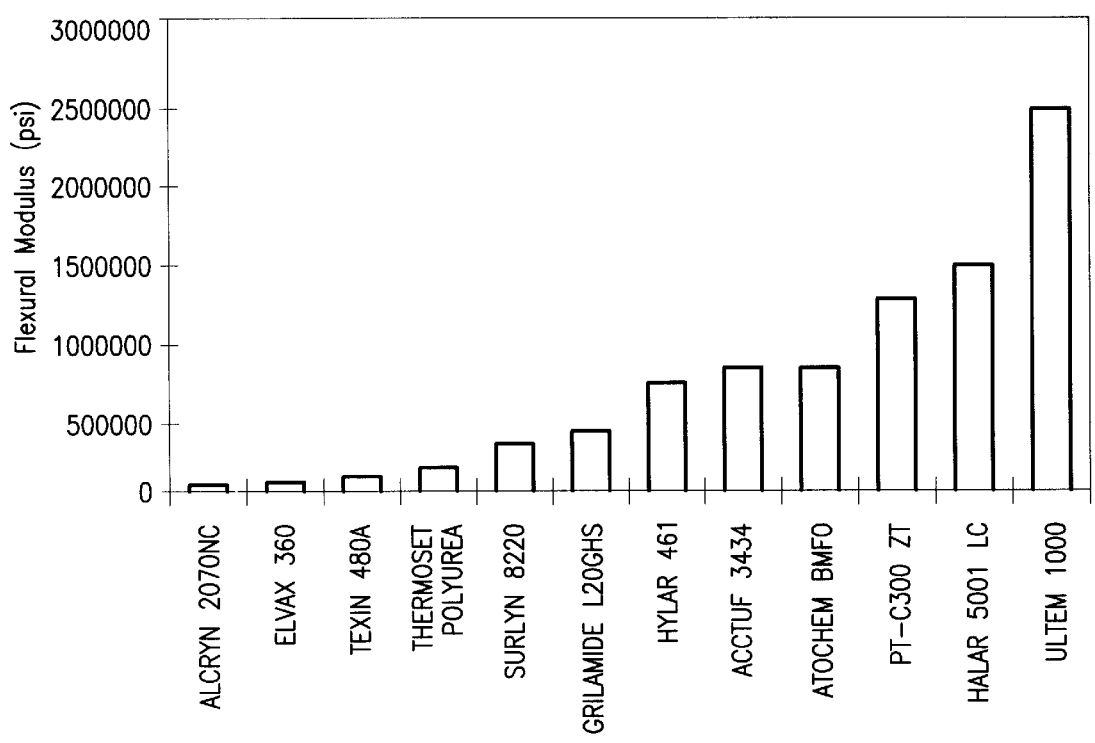
FIG. 6 shows the flexural modulus (psi) for various polymeric binders.

Six compression molded flexural test bars of each tungsten powder/polymeric binder mixture from Table 3 were subjected to a three point bend flexural test. FIG. 2 shows a picture of the three point bend flexural test fixture and a flexural test bar installed in an Instron testing machine. Each of the flexural bars was tested to failure using a modified ASTM D790 standard flexural test method. FIGS. 3 through 6 present the results from the flexural testing. The test results indicate that a wide range in flexural strength, displacement and modulus can be obtained by mixing different polymeric binders with tungsten powder. The elastomeric polymeric binders (ALCRYN 2070NC, ELVAX 360, TEXIN 480A and the polyurea thermoset) showed the most ductile behavior having the lowest flexural strength and modulus, and the highest flexural displacement. The high melt temperature polyetherimide (ULTEM 1000) mixture had the highest flexural strength and modulus but exhibited a brittle behavior with a low flexural displacement. The Nylon 12® (GRILAMIDE L20GHS) exhibited the second highest flexural strength and the highest flexural displacement excluding the elastomeric polymeric binders, but had a relatively low flexural modulus. Since ductility and strength are of paramount importance in cold forming tungsten powder/polymeric binder projectile cores, the Nylon 12® (GRILAMIDE L20GHS) and polyester thermoplastic elastomer (TEXIN 480A) polymeric binders were selected for injection molding into tensile bars and projectile cores.

Tensile Testing

Figure 7:
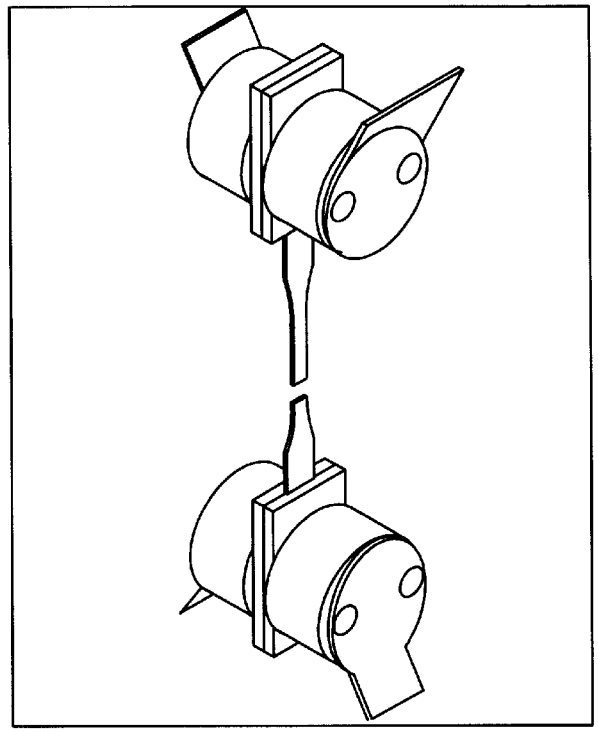
FIG. 7 shows a fractured tensile test bar after being pulled in the Instron tensile testing machine.
Figure 8:
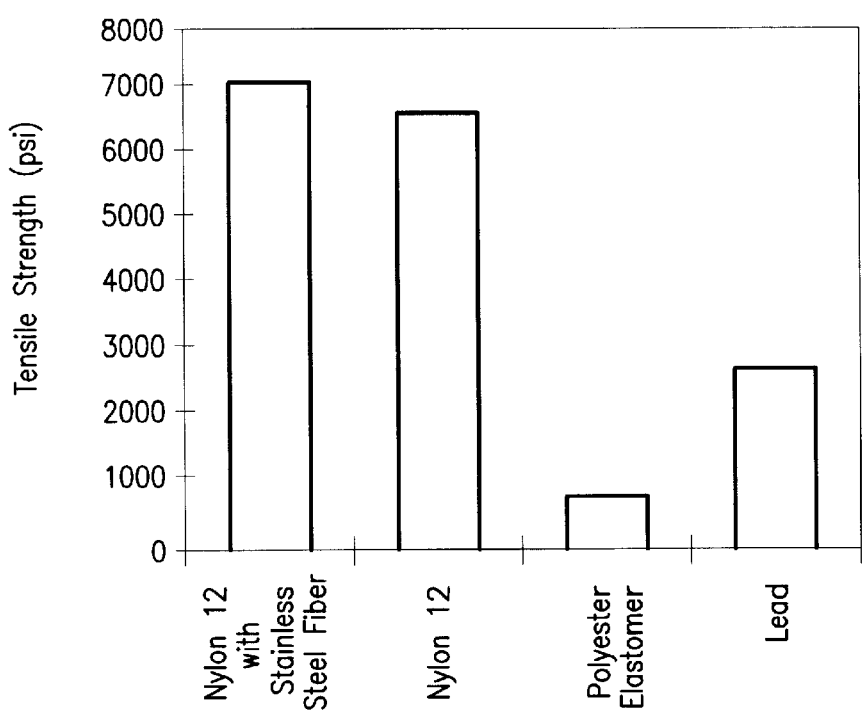
FIG. 8 compares the tensile strengths of Nylon 12®/Stainless Steel fiber composite, Nylon 12® composite, polyester elastomer composite and lead.
Figure 9:
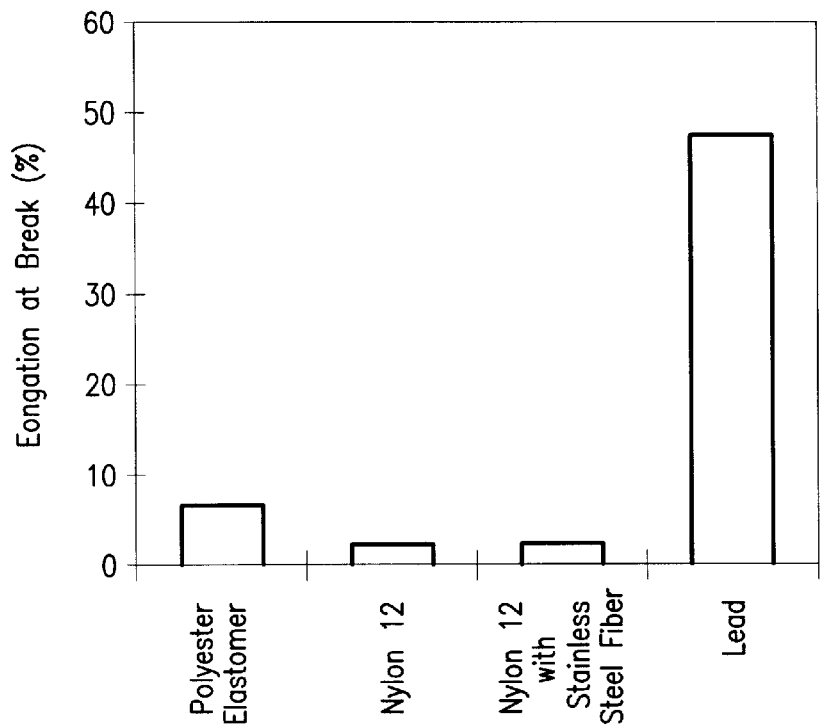
FIG. 9 shows the elongation at break of Nylon 12®/Stainless Steel fiber composite, Nylon 12® composite, polyester elastomer composite and lead.
Figure 10:
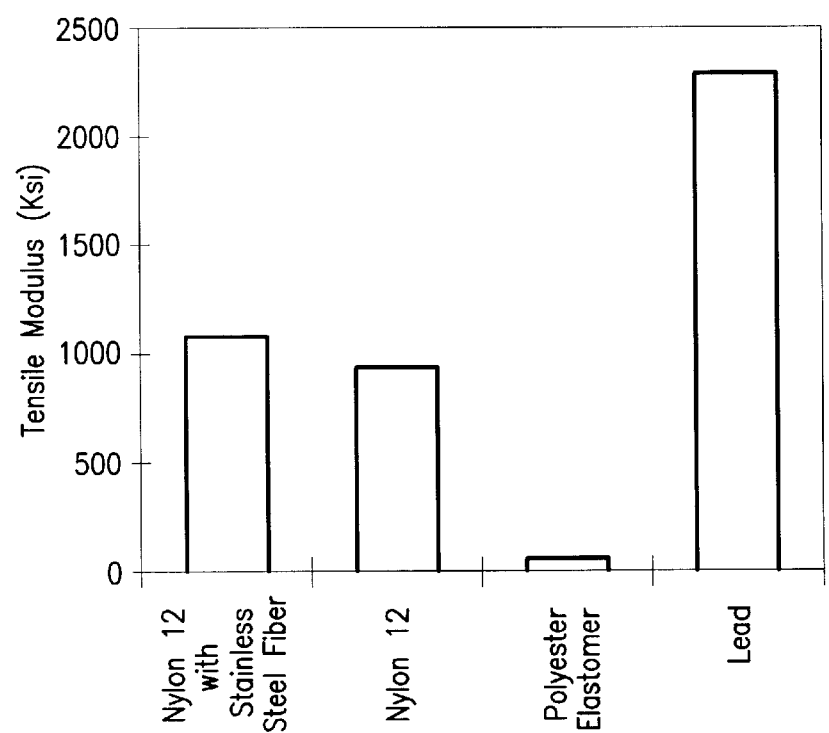
FIG. 10 shows the tensile modulus (ksi) of Nylon 12®/Stainless Steel fiber composite, Nylon 12® composite, polyester elastomer composite and lead.

Six tensile bars of each mixture were tested using an Instron tensile testing machine. The tensile tests were performed as per ASTM standard D638 test method. FIG. 7 shows a picture of a fractured tensile test bar after being pulled in the Instron tensile testing machine. FIGS. 8 through 10 show the results from the tensile testing.

FIG. 8 compares the tensile strength of the composite projectile core materials to lead. The Nylon 12®/tungsten powder/stainless steel fiber composite had the highest tensile strength of the three composite materials. The addition of stainless steel fibers increased the strength of the Nylon 12® tungsten powder composite approximately 4.5% from 6,769 to 7,074 psi. Both of the Nylon 12® composite materials had much higher tensile strengths than lead, while the polyester elastomer composite was approximately one third of that of lead. FIG. 9 compares the elongation at break values. None of the composite materials showed elongation values as high as the 50% value for lead. The polyester elastomer composite showed the most elongation of the composite showed the most elongation of the composite materials tested with a value of 5.9%. FIG. 10 presents the tensile modulus results for the composite materials relative to lead. The addition of stainless steel fiber provided an 8.6% improvement in tensile modulus from 974 to 1,058 ksi for the Nylon 12® composite material. The polyester elastomer had an extremely low modulus of 31.5 ksi compared to the 2,340 ksi modulus of lead.

The tensile test results show that Nylon 12® composite projectile possess a superior tensile strength and have a reasonably high tensile modulus compared to lead, but are much less ductile than lead. The addition of stainless steel fibers in the Nylon 12® composite material substantially increases the tensile strength and modulus with negligible reduction in ductility. The polyester elastomer was the most ductile of the composite materials, but had the lowest tensile strength and modulus.

TPP binder composites with specific gravities in the range of 10 to 11 may be formulated to produce a variation in physical properties, depending on the type of polymeric binder employed. Moreover, the incorporation of fibers, such as stainless steel fibers, into the tungsten powder/polymeric binder composite materials demonstrates an improvement in physical properties of the material.

Over 150 7.62 mm projectile cores with specific gravities ranging from 10.2 to 11.0 were injection molded using tungsten powder and stainless steel fibers and mixed in a Nylon 12® and polyester elastomer polymeric binder.

EXAMPLE II

Molding Projectile Materials

Projectile Materials

The polymeric binders, such as Nylon 12®, polyester elastomer, and polyetherimide were compounded with tungsten powder in the ranges of 2 to 4 microns, 4 to 8 microns and 20 to 40 microns, followed by physical evaluation of composite. Larger particle sizes have less total surface area than smaller particle sizes for a given mass of tungsten powder, therefore it is possible to add more of the larger particle size powder with the polymeric binder to produce a more dense TPP composite. In addition, fibers, such as stainless steel fibers, were added to the composite. Fibers may be added in volume ratios such as 10, 20, and 30%. The effect of fiber volume on the physical properties of the TPP composite is evaluated.

Injection Mold Specimens

Figure 11:
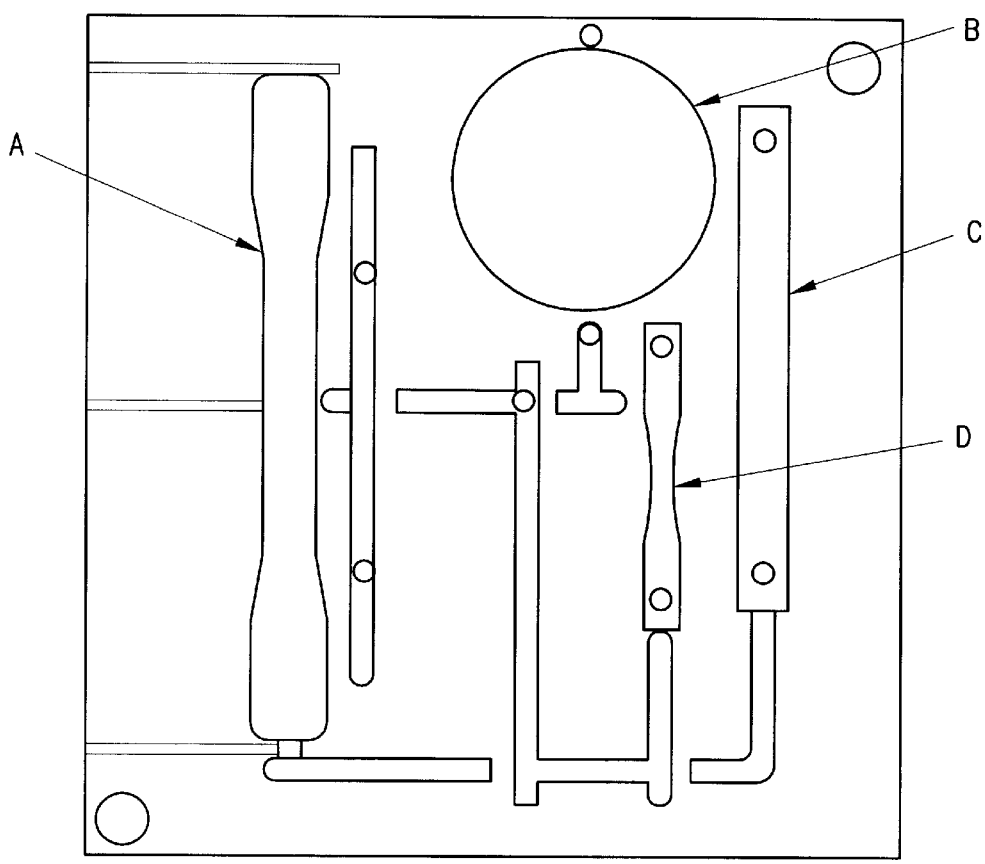
FIG. 11 shows a test specimen four cavity model injection mold. A-ASTM D638 Type 1 tensile bar; B-impact disc; C-impact bar; D-ASTM D638 Type V tensile bar.

Specimens may be injection molded from each of the TPP composite materials compounded as above. Molding of tensile and impact bars may be accomplished using, for example, the Master Precision Mold Test Specimen Four Cavity Model injection mold. See FIG. 11. The mold produces the following test specimens:

1. 0.04 inch thick by 2.5 inch diameter impact test disc;
2. 0.125 inch by 5.0 inch impact test bar;
3. 0.125 inch by 0.5 ASTM D638 Type I "dogbone"; and
4. 0.06 inch by 0.125 ASTM D638 Type V "dogbone"

FIG. 12 shows an injection molded TPP composite tensile bar. It is contemplated that the methods of the present invention will be utilized to mold ASTM D638 Type I "dogbone" tensile bars for tensile testing and impact test bars will be molded to Izod impact testing.

Materials Properties Testing

Materials properties tests are performed on each selected candidate TPP composite material to evaluate the physical behavior of the material and to compare the material properties of the composite material to lead. These tests were used to screen TPP composite materials demonstrating inadequate physical properties performance, such as low specific gravity, low ductility, low impact strength or low tensile strength. The physical properties testing consists of determining the specific gravity, performing tensile and Izod impact tests, and thermal expansion tests on each of the candidate TPP composite materials. The average specific gravity of each material is calculated by measuring the mass and volume of the tensile and impact bars injection molded as above.

Tensile Testing

Tensile testing has been performed on Nylon 12®, Nylon 12® with 10% stainless steel fibers, and polyester elastomer TPP composite materials. The tensile tests consisted of testing six ASTM D638 Type V tensile test bars of each TPP composite material in an Instron tensile testing machine. FIG. 7 shows a picture of a fractured TPP composite tensile test bar in the Instron testing machine. The average tensile strength, elongation at break and modulus were calculated for each material. FIGS. 8–10 present representative tensile test results that may be used to assess the tensile properties of each material and compare these tensile properties to lead.

Thermal Expansion Testing

The coefficient of thermal expansion is determined for each candidate TPP composite material. The thermal expansion is measured by attaching strain gauges to impact test bars. The strain gauges are oriented parallel and perpendicular to the long axis of the bar to measure the thermal expansion in the flow and cross flow mold directions. The testing is performed in a temperature controlled environmental chamber and thermocouples are attached to the bar to accurately measure temperature. An automated data acquisition system records both the temperature and strain in real time during the test. The TPP composite thermal expansion results are compared to the coefficient of thermal expansion for the copper jacket material to predict thermal stresses that would be applied to the TPP composite projectile core by the copper jacket due to differential thermal expansion. The coefficient of thermal expansion for copper is about 9.2 parts per million degree F., 2.55 for tungsten and 70 for Nylon 12®. Using the rule of mixtures, the estimated coefficient of thermal expansion for a tungsten powder/Nylon 12® composite with a specific gravity of 11.0 would be about 33.6 parts per million degree F.

Injection Molded Projectile Cores

One method of making copper jacketed injection molded metal powder polymeric binder composite projectile cores is to place the copper jacket into the injection mold and inject the metal powder polymeric binder composite material into the jacket cavity. The second and preferred method is to injection mold the tungsten powder/polymeric binder projectile core, insert the molded projectile core into the jacket, and cold form both the core and jacket into the desired bullet geometry.

Figure 13:
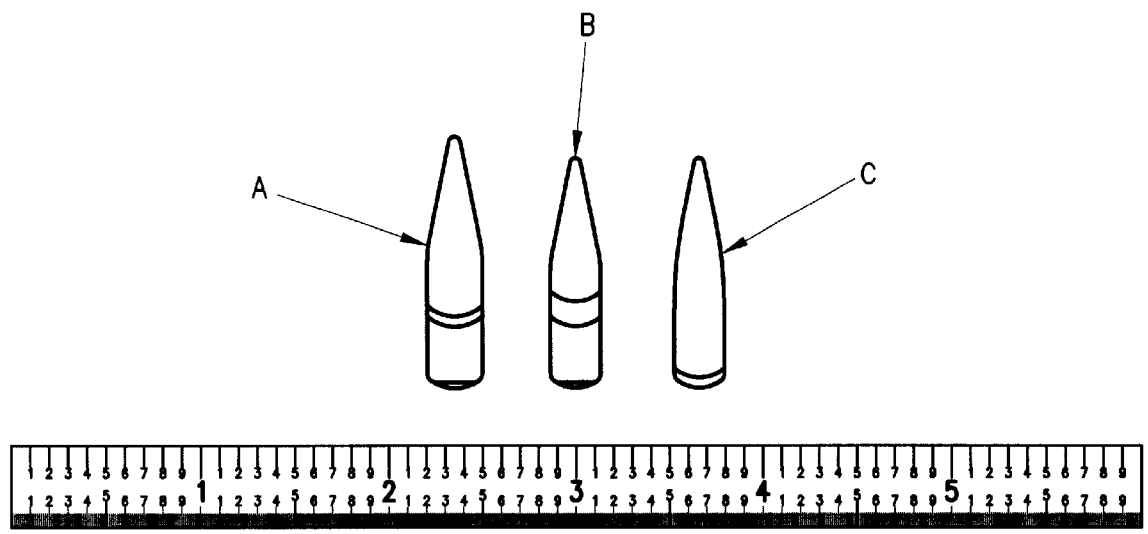
FIG. 13 shows a picture of a tungsten powder polymer binder injection molded projectile core (C), a lead projectile core (B), and a copper jacketed lead projectile core (A).
Figure 29:
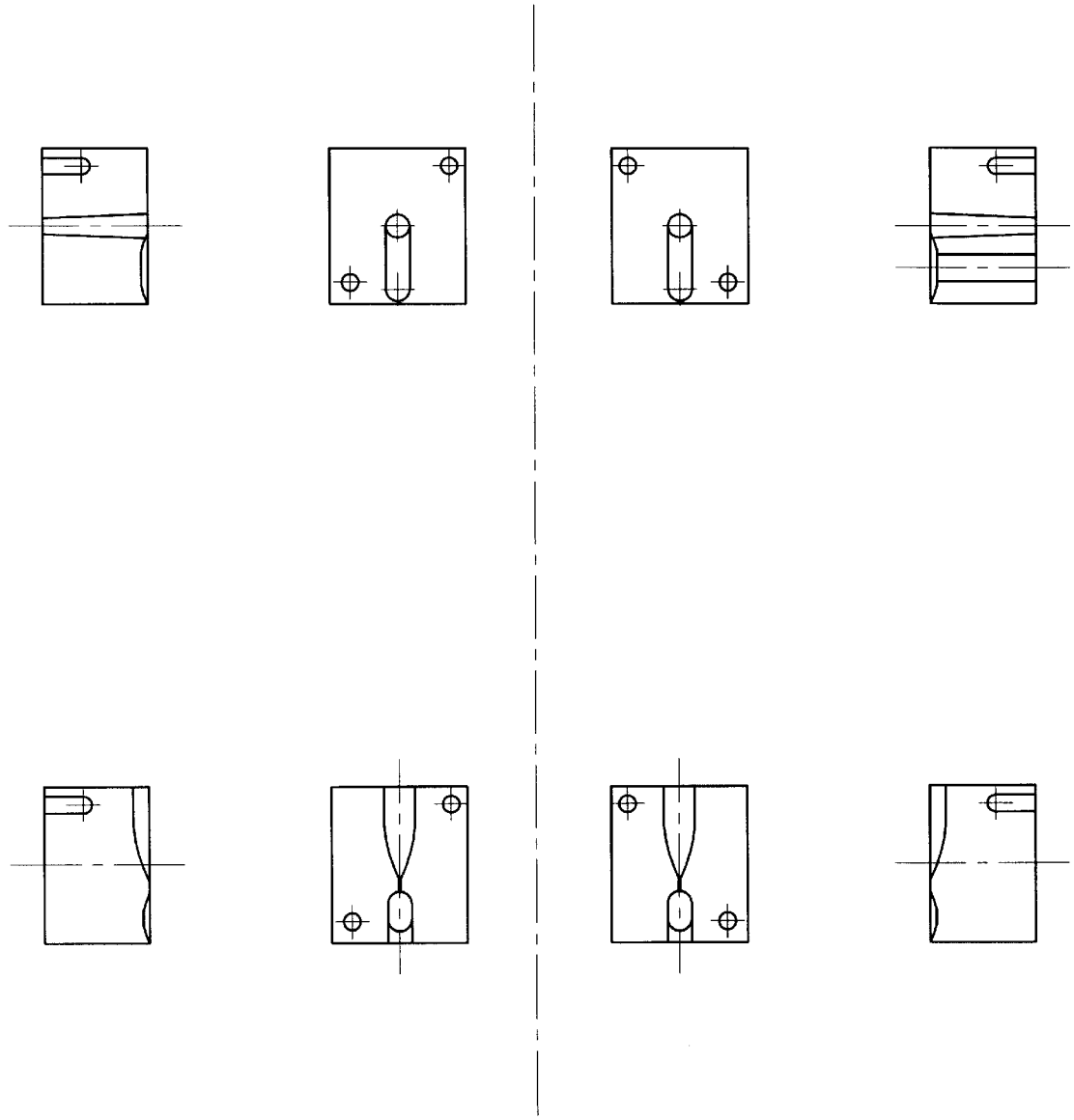
FIG. 29 shows a design drawing of prototype 7.62 mm projectile core single cavity injection mold.

FIGS. 29 and 30 are drawings of the 7.62 mm projectile core injection mold. About 50 projectile cores were injection molded from each of the metal powder (and stainless steel fibers) polymeric binder composite mixtures shown in Table 4. FIG. 13 shows a picture of an injection molded projectile core, a lead projectile core, and a copper jacketed lead projectile core.

The single cavity 7.62 mm projectile core injection mold may be modified into a multi-cavity mold to allow for more economical production of larger quantities of TPP composite projectile cores. It is also recognized that high volume production projectile core injection molds may be utilized with the formulations of the present invention. Such molds, for example, may contain about 32 cavities.

Currently, a copper jacket is cold formed onto the core. While this method may be suitable for the present compositions, another method is to heat the projectile core above room temperature but below the meld temperature of the polymeric binder (approximately 100 to 150 degrees C.) prior to insertion of the core onto the copper jacket. This in effect would change the cold forming process into a hot (or warm) forming process. Because the polymeric binders are thermoplastics they will become much more ductile at the warmer temperature allowing for improved forming of the projectile core into the final desired bullet shape. The second method is to change the shape of the injection molded core to more closely resemble the final copper jacketed bullet shape. This allows the molded projectile core to be cold formed into the final copper jacketed bulled shape with less deformation of the TPP composite material.

EXAMPLE III

Projectiles Cores

Figure 26:
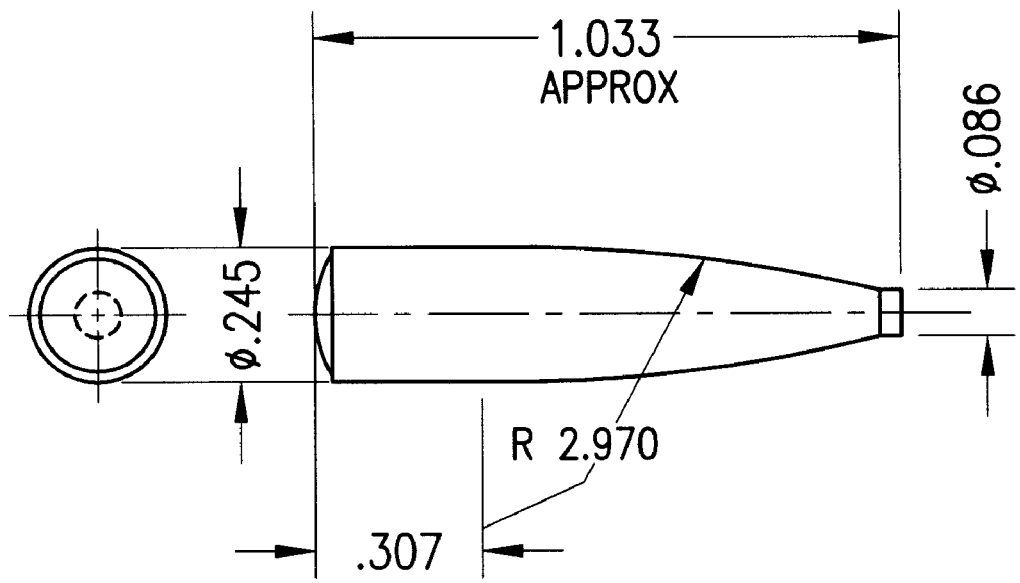
FIG. 26 shows a design drawing of a 7.62 mm projectile core (slug).
Figure 27:
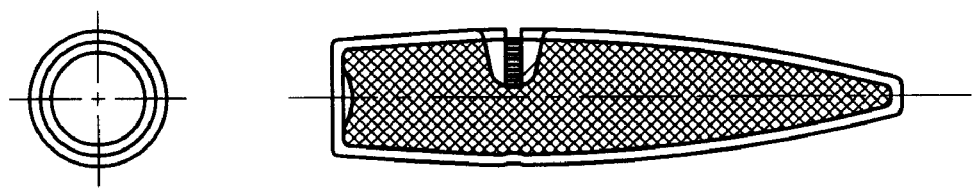
FIG. 27 shows a design drawing of a 7.62 mm bullet.
Figure 28:
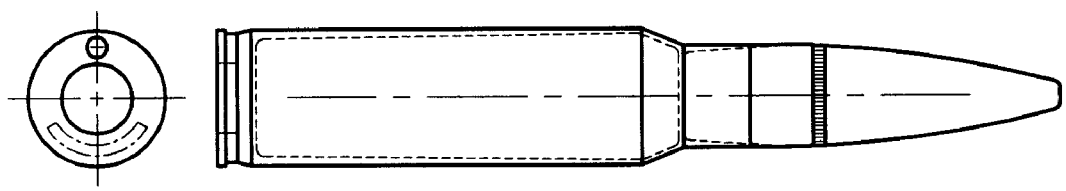
FIG. 28 shows a design drawing of a 7.62 mm M80 Nato Ball Cartridge.

Projectile cores suitable for the present invention include but are not limited to, for example, 5.56 mm, 9 mm, and .50 caliber ammunition. Also suitable are 7.62 mm and .45 caliber. FIGS. 26–28 are design drawings for 7.62 mm ammunition, and are used in design studies. Such design studies identify appropriate TPP composite materials to use for each type of lead projectile core replacement.

Table 5 shows the average projectile core weight and specific gravity, and Table 6 shows the average dimensional measurements for the TPP composite projectile cores.

TABLE 5

Average Weight and Specific Gravity of Injection Molded Composite Projectile Cores

| Composite Projectile Core Material | Average. Projectile Core Weight (g) | Average. Specific Gravity |
|---|---|---|
| Nylon 12 ® - Tungsten Powder | 5.76 | 11.0 |
| Polyester Elastomer - Tungsten Powder | 5.57 | 10.4 |
| Nylon 12 ® - Tungsten Powder with Stainless Steel Fibers | 5.25 | 10.2 |

TABLE 6

Composite Projectile Core Dimensional Measurements

| Composite Projectile Core Material | Average Diameter (inches) | Average Length (inches) |
|---|---|---|
| Nylon 12 ® - Tungsten Powder | 0.240 | 1.26 |
| Polyester Elastomer - Tungsten Powder | 0.242 | 1.27 |
| Nylon 12 ® - Tungsten Powder with Stainless Steel Fibers | 0.241 | 1.26 |

Compression tests are performed by placing the projectile core on a flat plate in an Instron testing machine oriented vertically with the tip of the projectile core up. A second flat plate attached to the crosshead of the machine allows the projectile core to be compressed between the two plates by the testing machine. The projectile core is tested to failure. A lead projectile core is also compression tested for comparison to the TPP composite cores, allowing a comparison between compressive strength, and modulus of each core.

Figure 14:
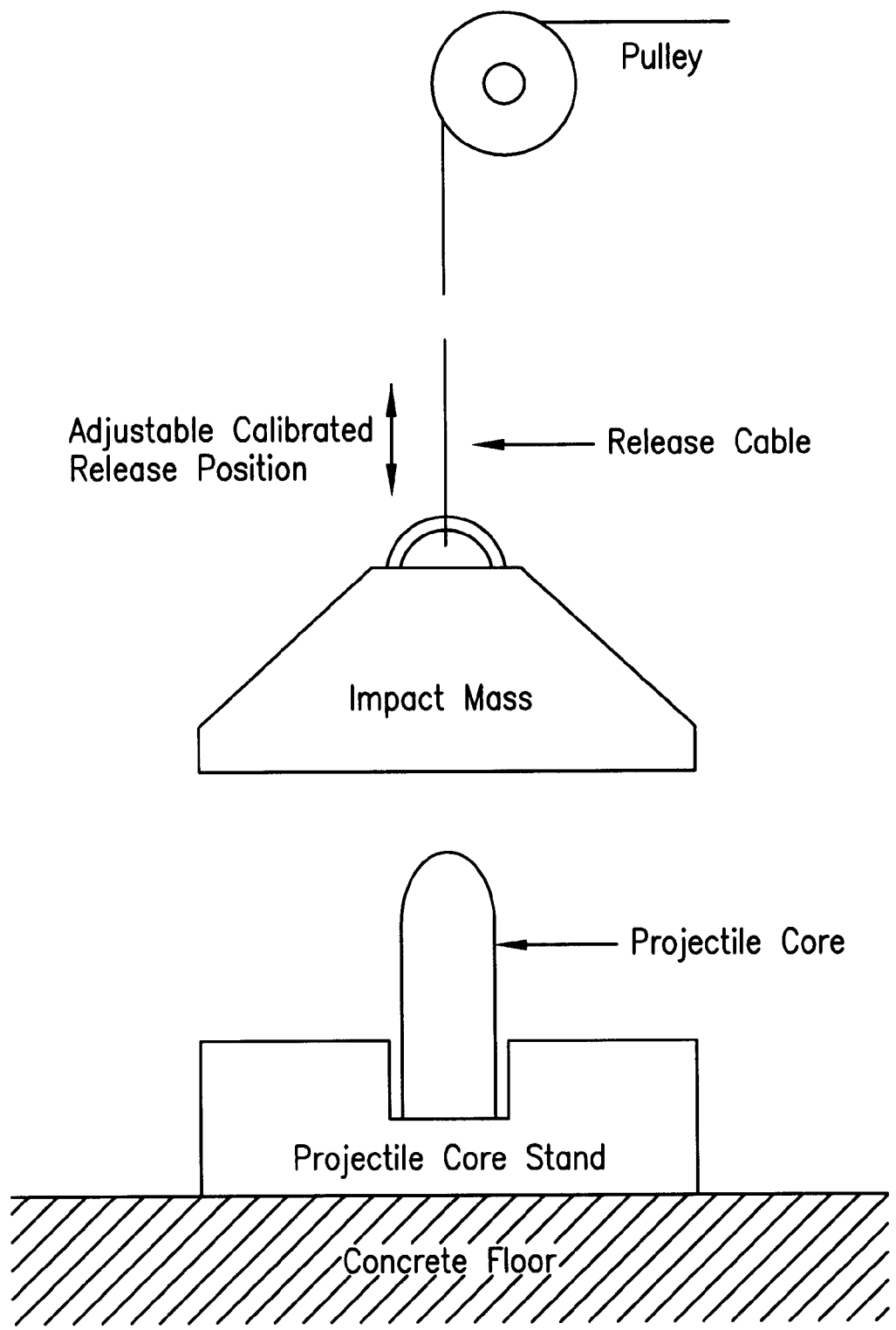
FIG. 14 shows a vertical drop compressive impact test that provides a qualitative assessment of the impact performance of the TPP composite material projectile cores and lead projectile cores.
Figure 15:
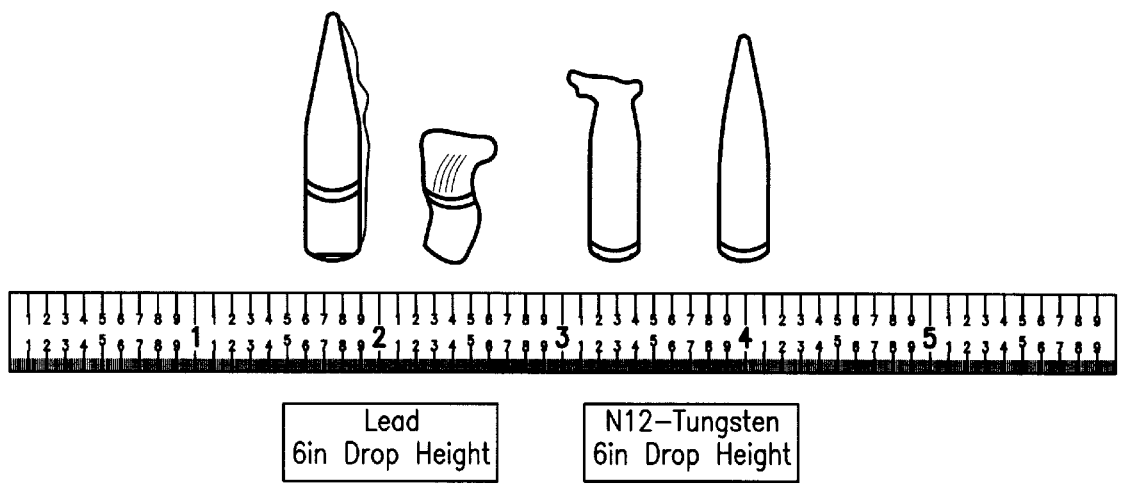
FIG. 15 shows vertical drop (6 inch drop height) impact test results for Nylon 12® tungsten powder composite projectile core and lead for comparison.
Figure 16:
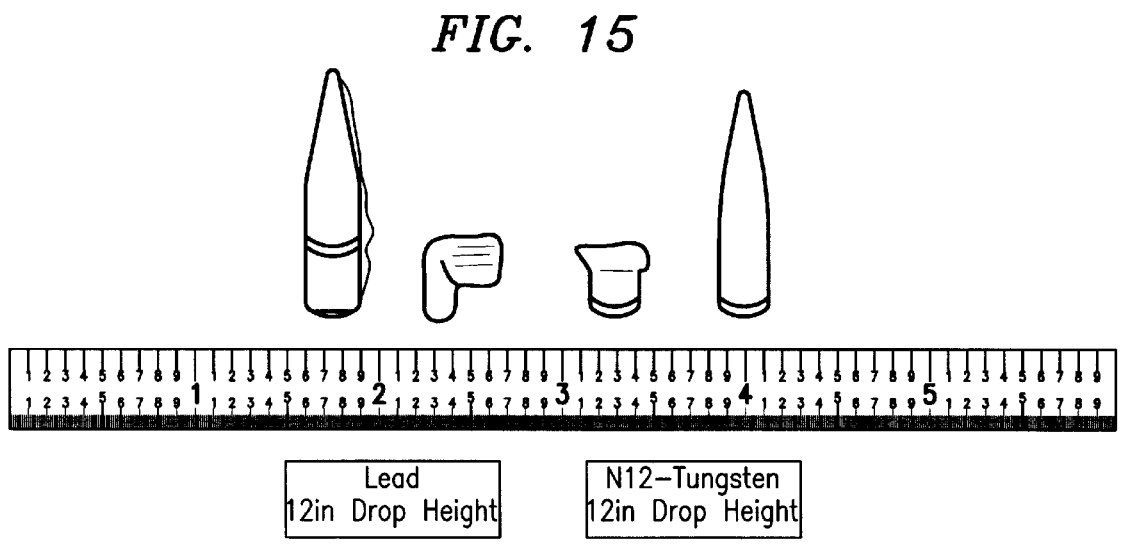
FIG. 16 shows vertical drop (12 inch drop height) impact test results for Nylon 12® tungsten powder composite projectile core and lead for comparison.
Figure 17:
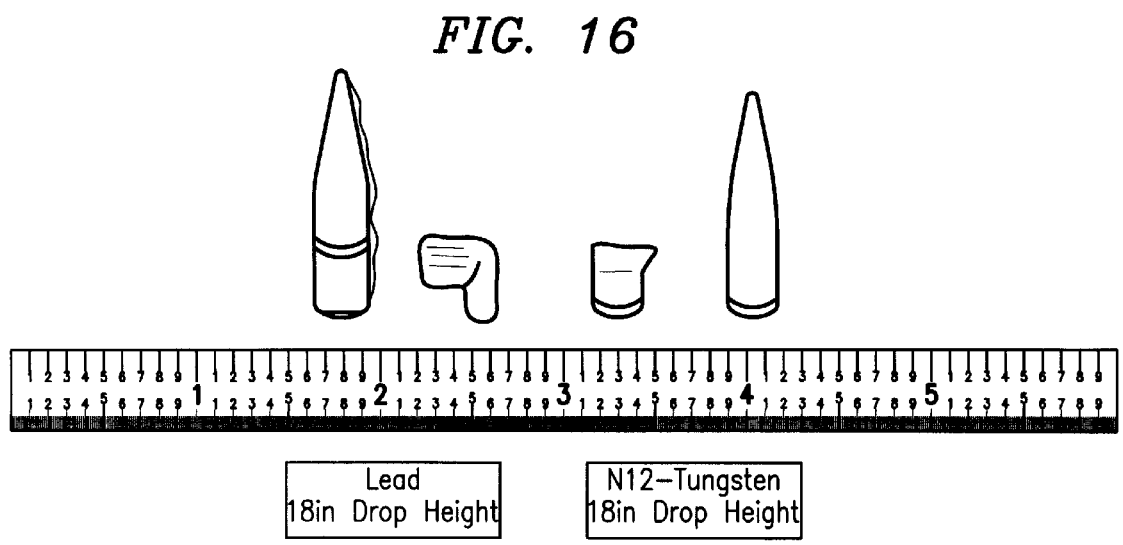
FIG. 17 shows vertical drop (18 inch drop height) impact test results for Nylon 12® tungsten powder composite projectile core and lead for comparison.
Figure 18:
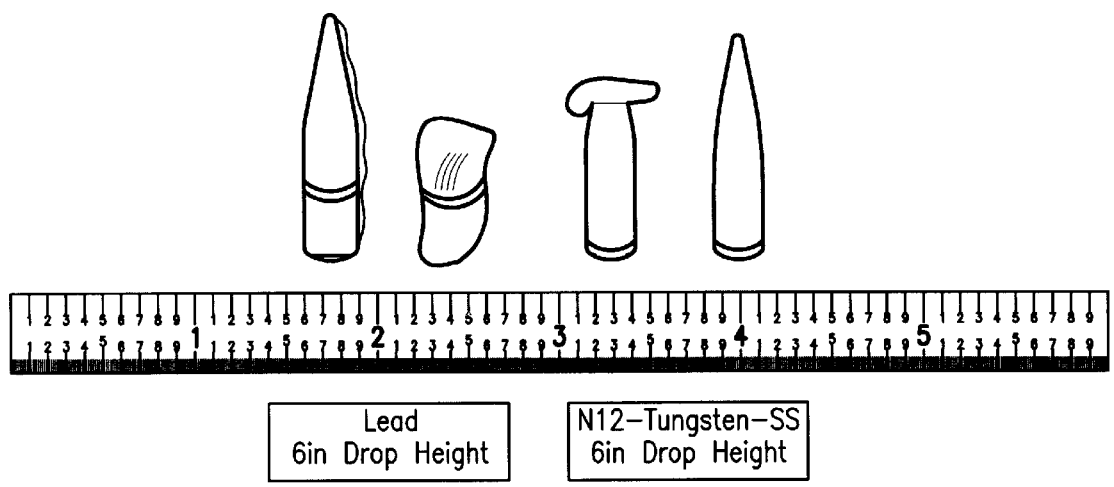
FIG. 18 shows vertical drop (6 inch drop height) impact test results for Nylon 12® tungsten powder with stainless steel fiber composite projectile core.
Figure 19:
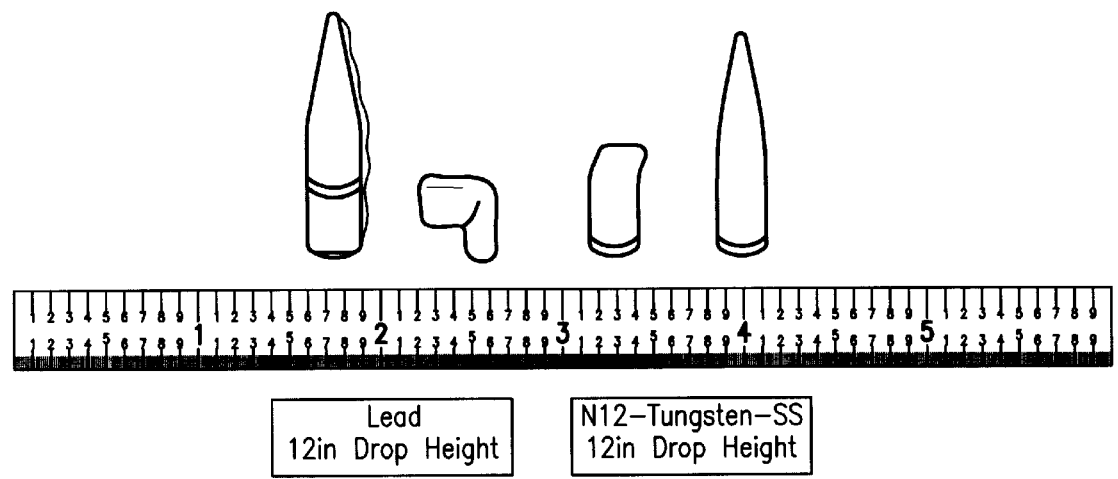
FIG. 19 shows vertical drop (12 inch drop height) impact test results for Nylon 12® tungsten powder with stainless steel fiber composite projectile core.
Figure 20:
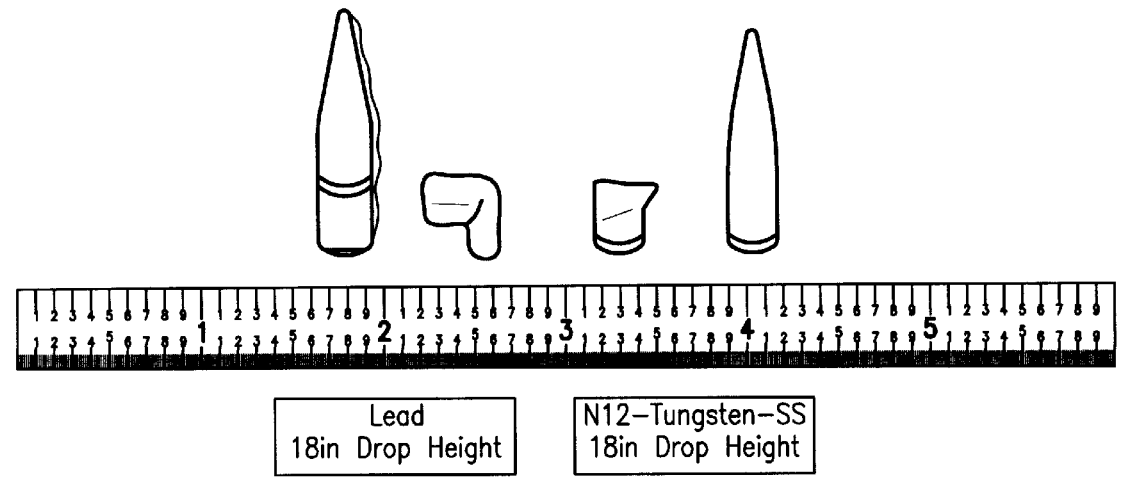
FIG. 20 shows vertical drop (18 inch drop height) impact test results for Nylon 12® tungsten powder with stainless steel fiber composite projectile core.
Figure 21:
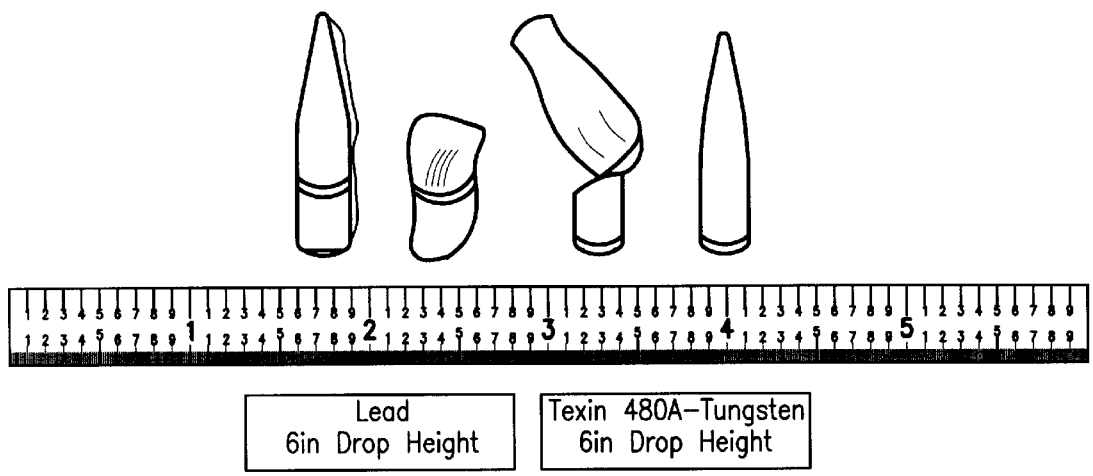
FIG. 21 shows vertical drop (6 inch drop height) impact test results for polyester elastomer (TEXIN 480A) tungsten powder with stainless steel fiber composite projectile core.
Figure 22:
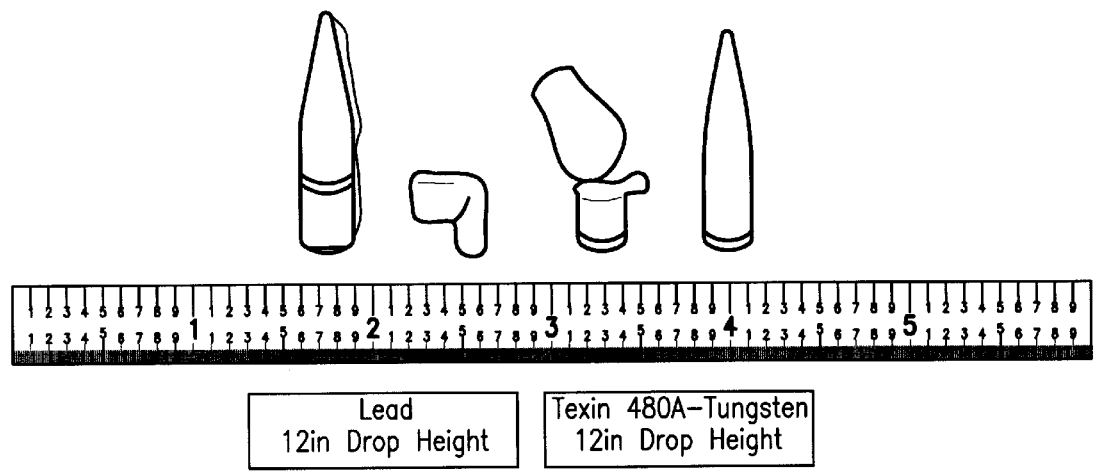
FIG. 22 shows vertical drop (12 inch drop height) impact test results for polyester elastomer (TEXIN 480A) tungsten powder with stainless steel fiber composite projectile core.
Figure 23:
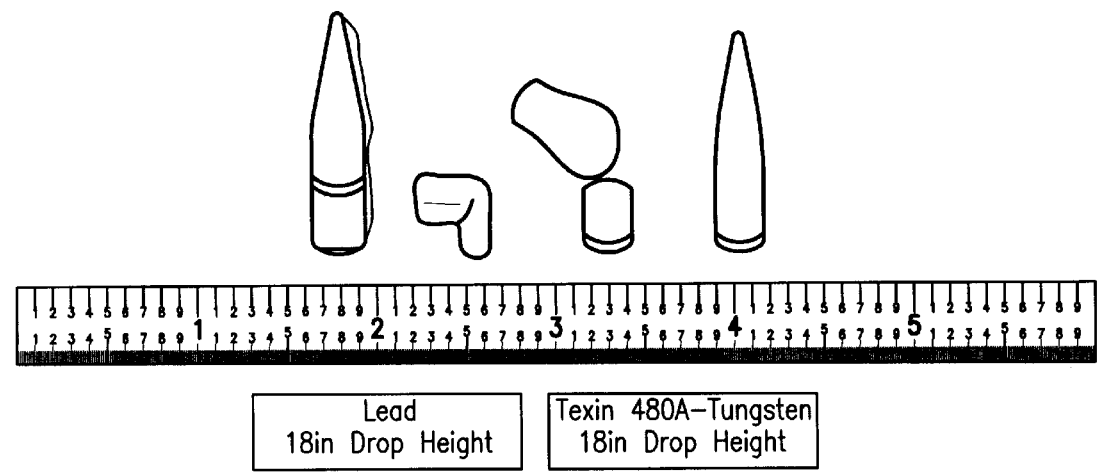
FIG. 23 shows vertical drop (18 inch drop height) impact test results for polyester elastomer (TEXIN 480A) tungsten powder with stainless steel fiber composite projectile core.

FIG. 14 shows a vertical drop compressive impact test that provides a qualitative assessment of impact resistance for each of the TPP composite material projectile cores and lead projectile cores. The projectile core is placed in a stand mounted on a concrete floor. An impact mass of 16.5 lb. is released from calibrated height positions of 6, 12, and 18 inches. FIGS. 15–23 show side-by-side comparison pictures of each candidate TPP composite material compared to lead. A visual comparison material showed the greatest impact resistance of the composite materials tested. This qualitative assessment indicates that the addition of stainless steel fibers substantially increases the impact resistance of the Nylon 12® tungsten powder composite materials. The Nylon 12® composite material with and without stainless steel fibers appear to perform as well or better than the lead projectile cores (retain the same or more of their original shape) at each drop height. The lead projectile cores show more deformation than the Nylon 12® composite cores, but the Nylon 12® cores tend to shed material at higher impact levels. The polyester elastomer projectile cores show about the same deformation as the lead cores but fragment at all drop heights.

Ballistic testing of projectile cores is accomplished by testing the velocity and pressure (ANSI/SAAMI method) from test barrels. Chamber pressure and velocity measurements are made simultaneously, and individual values, mean values, extreme variation of individual values, and standard deviation are measured. Also measured is accuracy from test barrels, bullet integrity and fouling, function and casualty of ammunition, penetration, and temperature stability.

Projectile Core Testing

Preliminary examination and testing was performed on the prototype injection molded projectile cores to compare their material behavior to that of the lead cores. Visual examinations were made of sections of projectiles to determine if any voids or porosity problems existed. None of the examined projectiles showed any void or porosity problems. Dimensional measurements were made to determine the dimensional stability of the tungsten powder/polymeric binder composite materials. Length and diameter measurements were made on randomly selected projectile cores from each of the projectile core composite materials. Table 6 presents the dimensional measurement results.

All three of the composite materials showed excellent dimensional stability after injection molding. The diameter and length measurements were consistent with only a 1 to 2 mils difference between individual projectile cores. Each of the three composite materials had similar diameter and length measurements with the polyester elastomer having slightly larger dimensions than the Nylon 12® composites. All of the materials showed mold shrinkage having smaller dimensions than the design drawing specifications of 0.245 inches in diameter and 1.033 inches in length. This indicates that the projectile core injection mold will have to be adjusted accordingly once a final composite material is selected. The mass and volume of the injection molded projectile cores were measured and the specific gravity of each composite materials was determined. Table 5 presents the weight and specific gravity of the candidate metal powder (and fiber) polymeric binder composite projectile cores.

Eleven thermoplastic injection moldable and two thermosetting polymers were successfully mixed with tungsten powder producing projectile core composite materials with specific gravities ranging from 10.0 to 10.63. A wide range in physical properties was achieved depending on the type of polymeric binder system employed. The tungsten powder/polymeric binder composite materials showed physical behavior ranging from brittle to highly ductile. The flexural strength of the composite materials ranged from 509 to 12,990 psi, the maximum flexural displacement ranged from 0.02 to 0.46 inches, and the flexural modulus ranged from is 16.2 to 2,531 ksi.

Stainless steel fibers were successfully added to two tungsten powder/polymeric binder composite projectile core materials to improve physical properties and reduce cost. Both tensile bars and projectile cores were successfully injection molded using 46% by volume tungsten powder and 10% by volume stainless steel fibers in a polymeric binder.

Tensile test results show that the Nylon 12® tungsten powder composite materials possess the required tensile physical properties for projectile core applications. The addition of stainless steel fibers produced a significant increase in tensile strength and modulus of the Nylon 12® tungsten powder composite material.

A qualitative assessment of vertical drop impact results showed that the Nylon 12® tungsten powder composite materials with and without stainless steel fibers had equal or superior impact strength when compared to lead. The Nylon 12® tungsten composite material with stainless steel fiber showed the highest impact resistance of the composite materials tested.

Both tungsten powder/polymeric binder composites and tungsten powder and stainless steel fiber polymeric binder composite materials can be easily mixed together and injection molded using standard mixing and molding equipment. No mixing problems were encountered with tungsten powder volume ratios as high at 54% and a stainless steel fiber ratio of 10%. Visual examination of the molded projectile cores showed excellent surface finish and no void or porosity problems were identified. Although no formal procedure was used to measure the balance of the projectile cores, a visual examination of the sectioned cores showed the appearance of an even distribution of metal powder and fibers in the polymer matrix.

EXAMPLE IV

Tungsten/Nylon 12® and Tungsten/Nylon 12®/Stainless Steel Composites for Use as Projectiles: Bullet Assembly and Testing Two composite materials were developed for use in projectile assembly as illustrations of the uses of the compositions of the present invention. These materials included a tungsten/Nylon 12® composite and a tungsten/Nylon 12®/stainless steel composite. Stainless steel fibers (0.125" long, 75 micron diameter) were used in the second composite to provide a 4% increase in flexural strength and 8% increase in tensile modulus. The process for manufacturing the materials consists of mixing each component in a Brabender-type mixer and then grinding the materials into particles. The tungsten/nylon composite is ground much finer than the stainless steel composite which is left as a more coarse material so as not to damage the steel fibers. Once the materials are mixed, they are put in a drier for 24 hrs. After the drying process, the material is fed into a hopper and injection molded to final shape. Cores were molded by Gate Mold, Inc., Round Rock, Tex. Processing time for each slug was approximately 20 seconds. This time may be significantly reduced if a multi-cavity mold is used. In addition, the amount of waste material (material that cures while in the runner system) may also be eliminated, substantially reducing unit cost, if a hot runner system or valve-gate mold is used. However, this type of mold was not considered economical for the limited number of projectiles required for this evaluation.

TABLE 7

Candidate Projectile Materials

| MANUFACTURER | DESIGNATION | COMPOSITE MATERIALS |
| --- | --- | --- |
| Texas Research Inst. | Non-Toxic Material #1 | Tungsten/Nylon 12 ® |
| Texas Research Inst. | Non-Toxic Material #2 | Tungsten/Nylon 12 ®/Stainless Steel |

Figure 30A:
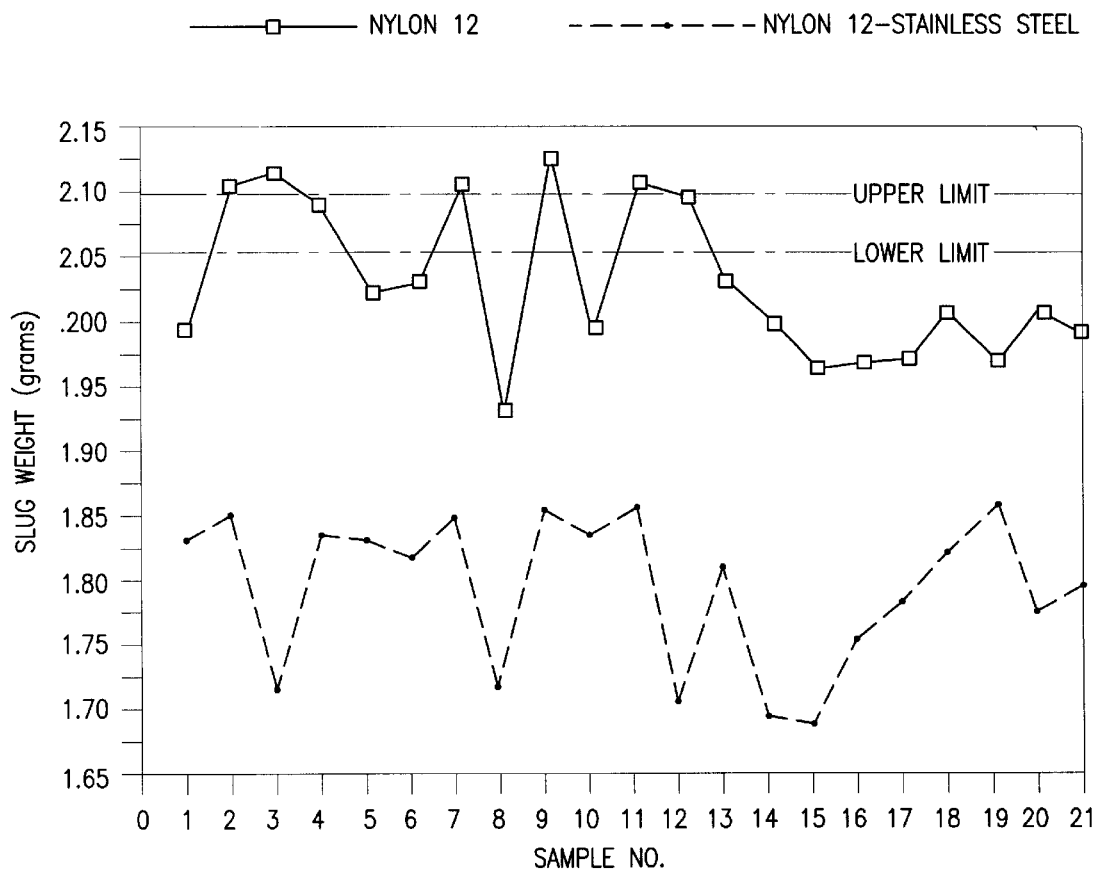
FIG. 30A, FIG. 30B and FIG. 30C show inspection results depicting slug weight (FIG. 30A), slug length (FIG. 30B) and slug diameter (FIG. 30C) for tungsten/Nylon 12® and tungsten/Nylon 12®/stainless steel composites.
Figure 30B:
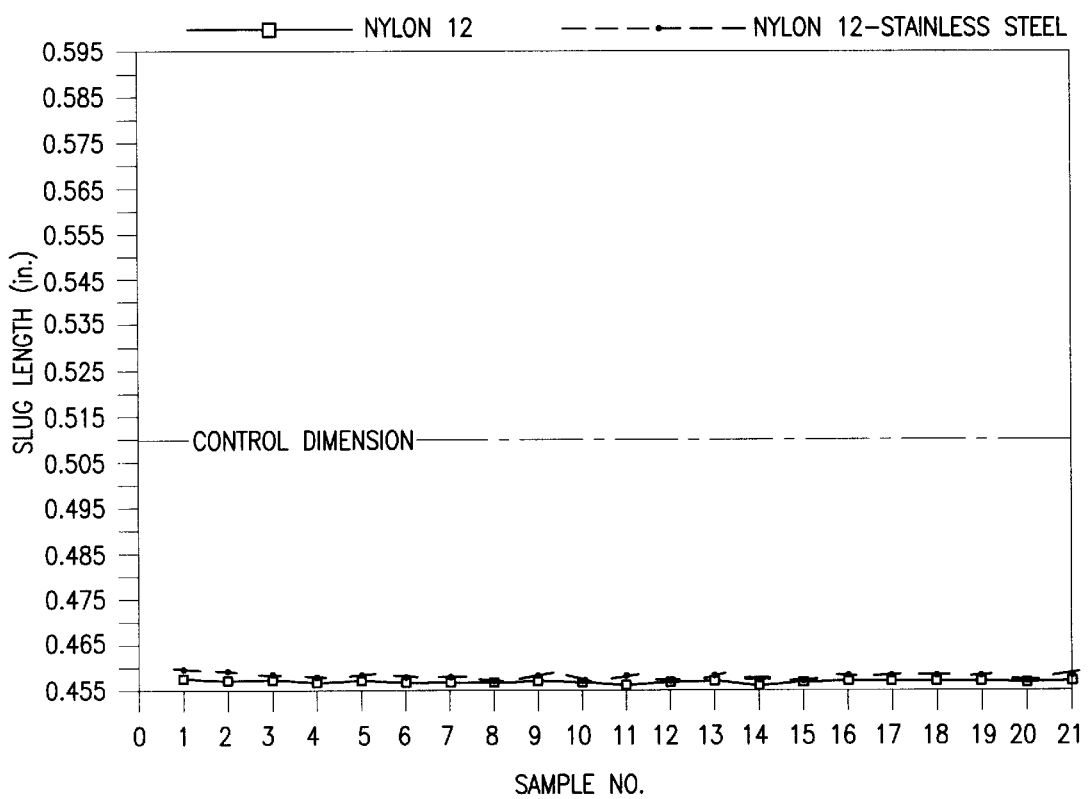
Figure 30C:
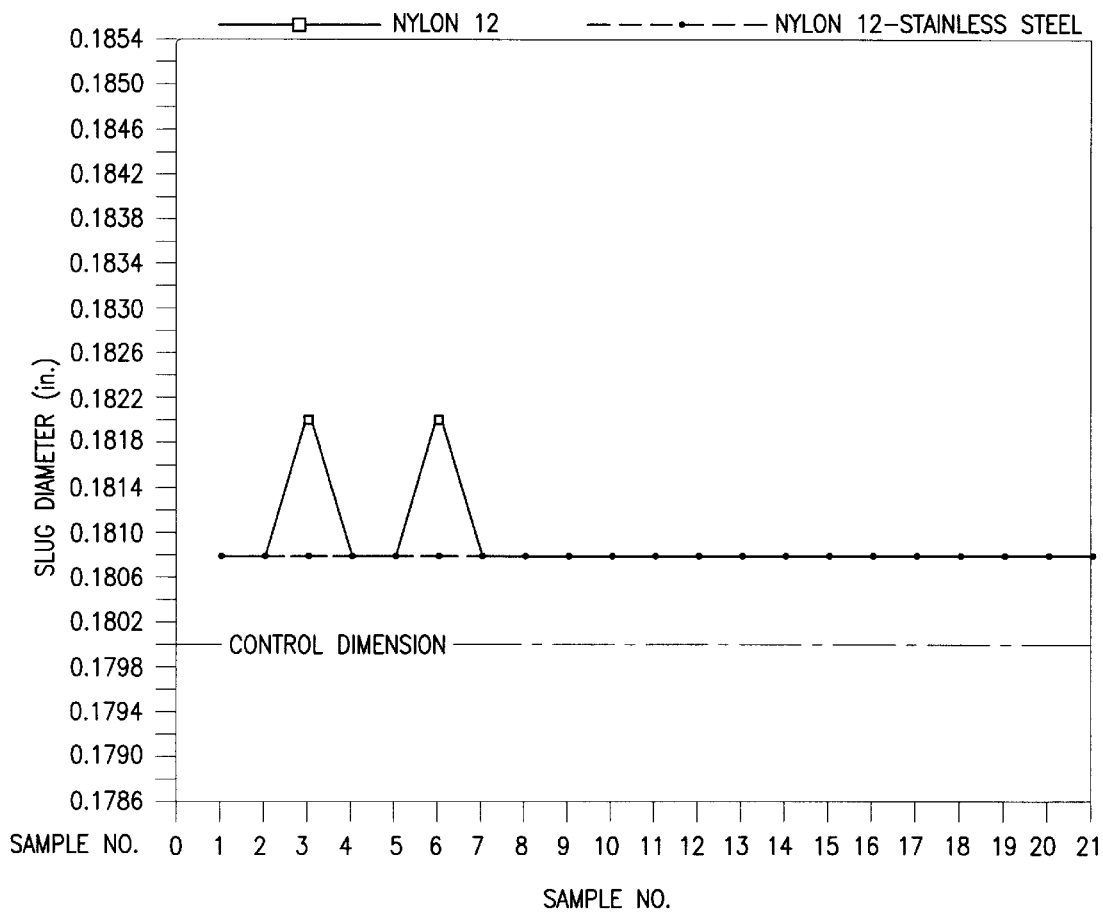

Initial post mold quality control inspections of the cores yielded some significant findings. The cores manufactured by TRI demonstrated excellent uniformity in terms of core length and diameter. However, there was significant amount of variation noted in the core weight. Average weights of both composites were below the 32±0.3 grain requirement. The tungsten-Nylon 12® composite, although close to the requirement, averaged 31.3 grains while the tungsten-Nylon 12®-stainless steel composite was significantly lighter, averaging 27.5 grains. Part of the reason for the low weight was the core overall length, which, although consistent, was approximately 0.052 in. less than the recommended length due to post mold shrinkage. If the stainless steel composite cores were molded to the recommended length the corresponding weight would be 30.8 grains, much closer to meeting the requirement. The primary cause for the variation in weight, however, was the use of regrind material during the molding process. Regrind material comes from the excess material which cures in the runner system of the mold for each part produced. This excess is then reground, mixed, and reintroduced into the molding process. During this process the physical properties of the nylon, such as density, are altered significantly, resulting in variations in the final product. Both of the problems noted with these cores (length and weight) may easily be corrected. By modifying the mold cavity, overall length may be increased as required, and by using only virgin nylon material, the variation in weight will be reduced or eliminated. Also, if a mold with a hot runner system or a valve-gate type mold were used, although initially more expensive, would help to eliminate any excess (waste) material during the molding process. However, if these cores are to be recycled, the tungsten and nylon may be separated and only the tungsten re-used. Inspection results for both core materials are shown in FIG. 30A, FIG. 30B and FIG. 30C.

Table 8 shows a comparison of the average measured weights and dimensions for each sample as compared to the dimensions shown on the core drawing. The Score Factor in the far right column is a cumulative total of the percentage difference between the average sample dimension and the corresponding drawing (requirement) dimension. Therefore, the lowest scoring factoring represents the closest similarity to the desired weight and dimensions.

TABLE 8

Core Dimensional Characteristics

| MATERIAL | *DIA. (in.) | *LENGTH (in.) | WEIGHT (grams) | SCORE FACTOR |
| --- | --- | --- | --- | --- |
| Requirement | 0.180 | 0.510 | 2.074 ± 0.019 | |
| | | Average Measurements | | |
| Lead (Control) | 0.175 | 0.503 | 2.067 | 16.8 |
| Non-Toxic Material #1 | 0.181 | 0.457 | 2.026 | 13.3 |
| Non-Toxic Material #2 | 0.181 | 0.459 | 1.789 | 24.3 |

*Length and diameter are given as basic dimensions. Final configuration is determined by core weight.

Bullet Assembly

One-thousand (1,000) 5.56 mm M855 projectile cores manufactured from each of the materials described above were delivered to Lake City Army Ammunition Plant in June 1996. These cores were assembled into 5.56 mm cartridges. Assembly included jacketing the cores, forming the bullets, and loading into cartridge cases. Assembly was conducted on a Waterbury-Farrel Bullet Assembly Machine (BAM) currently being used for M855 projectile production. Core samples were initially hand fed and the BAM adjusted until a dimensionally correct bullet was produced. The remaining cores were then put into the hopper and fed automatically into the assembly process. Samples of assembled bullets were randomly collected and inspected for weight and dimensions throughout the assembly process.

Another sample used was the tungsten-nylon composite, TRI#1, developed by the inventors. No adjustments were made to the BAM from the previous sample. This sample ran exceptionally well, meeting all dimensional requirements while presenting no feed or assembly problems. The TRI#2 sample, the tungsten-nylon-stainless steel composite, was then used. Again, no adjustments were made to the BAM and no feed or assembly problems were encountered. Bullets met all dimensional requirements, however, the weight of the TRI#2 samples were approximately 3–4 grains below the requirement.

Upon completion of bullet assembly, a 10% inspection was performed on a random sample taken from each lot. Bullets were weighed and measured for overall length, boattail length, diameter, ogive profile, cannelure location, point diameter, boattail profile, as well as point and boattail concentricity.

The TRI#1 samples showed a higher degree of weight variation. With the TRI#1, 7% of the inspected parts weighed 60.2 grains, 0.1 grains below the minimum weight while the TRI#2 sample had only 5% within requirements. The remainder of the latter sample fell below the minimum weight, averaging 58.2 grains which was expected due to the use of regrind material during the molding process.

Overall length measurements revealed that samples of each material contained between 6 to 21 parts that were 0.0005" to 0.005" above the overall length requirements. Boattail lengths on the other hand were all within Government control limits, with each sample showing about as much variation as the control. Other dimensional characteristics such as diameter, ogive and boattail profile, cannelure location, and point diameter typically are measured with various go/no go gauges. Upon inspection, 100% of each sample met the ogive profile and cannelure location requirements.

A summary of the weight and dimensional characteristics are shown in the Tables below. Again, the score factor shown at the bottom of each table is the cumulative total of the percentage difference between the average measured dimension and the corresponding drawing dimension. In Table 9, the average values for point and boattail concentricity were added to this cumulative total since the desired concentricities are 0.0 in. and not the values shown in parentheses, which represent the acceptable maxima. In Table 4, only a go/no-go criteria was used during the inspection. The percentage of samples of each material that fell in the no-go category is shown. As before, the lowest score factor represents the closest similarity to the desired weight and dimensions.

TABLE 9

Inspection Results

| Dimensions | TRI #1 | TRI #2 | Control |
| --- | --- | --- | --- |
| Weight (61.8 ± 1.5 grains) | 61.700 | 58.200 | 62.400 |
| Over-All Length (0.923–0.030 in.) | 0.916 | 0.914 | 0.908 |
| Length of Boattail (0.110–1.010 in.) | 0.106 | 0.106 | 0.107 |
| Point Concentricity (0.005 in.) | 0.004 | 0.003 | 0.004 |
| Boattail Concentricity (0.003 in.) | 0.001 | 0.000 | 0.000 |
| Score Factor | 5.06 | 10.73 | 5.72 |

TABLE 10

Fixed Gage Inspection Results
Percentage of Sample Out of Specification Limits

| Characteristics | TRI #1 | TRI #2 | Control |
| --- | --- | --- | --- |
| Diameter (0.2245–0.0006 in.) | 31 | 53 | 0.0 |
| Ogive Profile | 0.0 | 0.0 | 0.0 |
| Cannelure Location (0.485–0.010 in.) | 0.0 | 0.0 | 0.0 |
| Point Diameter (0.040–0.022 in.) | 2 | 3 | 7 |
| Boattail Profile (0.2245–0.0006 in.) | 100 | 100 | 0.0 |
| Score Factor | 1.33 | 1.56 | 0.07 |

Cartridge Loading

Prior to final cartridge loading, a sample of 15 cartridges were loaded using each core type to confirm that the selected charge weights would be effective under the production assembly conditions. This is standard procedure for all loading operations. After the initial pre-load, pressures and velocities were found to be high. Charge weights were then adjusted and a second pre-load showed the pressures and velocities to be acceptable. All bullets were then assembled into M855 cartridges using the standard plate loading equipment and M855 cartridge cases. WC844 propellant, lot 49924, was used for the entire loading operation. Pre-load and final charge weights are shown below.

TABLE 11

Propellant Charge Weights
Propellant: WC844, Lot 49924
Primer: Lot LC96D704-435
Propellant Charge Weights (Grains)

| Projectile | Hand Load | 1st Pre-Load | 2nd (Final) Pre-Load |
| --- | --- | --- | --- |
| TRI #1 | 27.5 | 27.5 | 27.3 |
| TRI #2 | 27.3 | 27.3 | 27.1 |
| Control | 27.2 | 27.2 | None Fired |

Upon completion of loading, all cartridges were subjected to a 100% gage and weigh inspection. This includes weighing each cartridge, measuring overall length, and measuring head to shoulder length. The inspection showed no defects with the TRI#1 composite. Inspection of the TRI#2 composite showed approximately 50% of the cartridges to be under weight, which was due to the low projectile weight. Ten cartridges of each type were also weighed on an electronic scale for weight verification.

Test Program

Cartridges made from lead and each of the composites TRI#1 and TRI#2 were then subjected to a series of tests to assess the interior, exterior and terminal ballistic performance of each material candidate. Throughout Phase I, the current 5.56 mm M855 cartridge was used as the baseline (control or reference) for assessing performance. Testing was conducted at three locations: Lake City Army Ammunition Plant, Naval Surface Warfare Center, Crane, and the Armament Technology Facility (ATF), Picatinny Arsenal. Testing conducted by LCAAP included Electronic Pressure, Velocity and Action Time (EPVAT) as well as dispersion at a 600 yard range. Both of these tests were conducted at hot (+125° F.), cold (−65° F.), and ambient (70° F.) temperatures. EPVAT testing was used to identify the pressures the projectiles were subjected to when launched from a gun tube as well as the corresponding velocities achieved while dispersion testing provided a true indication of the performance of the rounds in terms of stability during flight and uniformity during manufacture.

Electronic Pressure, Velocity and Action Time Test

Results of the EPVAT test are shown in Table 12®. Data obtained from this test included casemouth pressure, port pressure (the pressure at a mid-point in the barrel comparable to the gas port location on automatic weapons), velocity at 78 ft from the muzzle, and action time which is the time from primer indent to when peak port pressure is obtained. Both TRI composites met all the requirements for pressure, velocity and action time at each of the three temperatures. It is also interesting to note that the TRI#2, which had the largest weight variation, demonstrated a velocity variation similar to that obtained with the control sample. In addition to recording pressure and velocity, a rolling witness paper, which was scrolled after each shot, was placed 25 ft. in front of the weapon in order to record any instances of projectile break-up or yaw. Throughout the test there was no evidence of projectiles yawing or becoming unstable. This indicates that the thermal expansion and contraction of the materials at the extreme temperatures is negligible. Also, the TRI composites showed no evidence of projectile/core break-up.

TABLE 12

EPVAT Test Results

| SAMPLE | CASEMOUTH PRESSURE (psi) | PORT PRESSURE (psi) | VELOCITY @ 78' (fps) | ACTION TIME (mS) |
|---|---|---|---|---|
| Requirement | | | | |
| Ambient | 55,000 (max) | 13,000 (min) | 3,000 ± 40 | 3.0 (max) |
| Hot/Cold | <7,000 psi var. from amb. avg. | 12,700 (min) | <250 fps var. from amb. avg. | |
| TRI #1 (Average of 20 rounds fired at each temperature) | | | | |
| Ambient | 49,531 | 13,861 | 3,021 | 0.897 |
| Hot | 53,592 | 14,215 | 3,103 | 0.883 |
| Cold | 44,192 | 13,461 | 2,880 | 0.932 |
| TRI #2 (Average of 20 rounds fired at each temperature) | | | | |
| Ambient | 46,864 | 13,752 | 3,009 | 0.892 |
| Hot | 49,984 | 14,140 | 3,089 | 0.884 |
| Cold | 42,464 | 13,340 | 2,860 | 0.937 |
| Control (Average of 20 rounds fired at each temperature) | | | | |
| Ambient | 48,927 | 13,584 | 3,008 | 0.891 |
| Hot | 54,105 | 13,816 | 3,101 | 0.870 |
| Cold | 43,427 | 13,029 | 2,866 | 0.933 |

Dispersion Testing

Dispersion tests were then conducted using a M700 receiver and two accuracy barrels mounted in a v-slide. Each of the barrels had approximately 1,250 rounds fired prior to this test and were qualified with M855 reference ammunition. Two record targets consisting of 10 rounds each were fired from each barrel at ambient, hot (+125° F.), and cold (−65° F.) temperatures with both TRI samples and the control sample. Ammunition was temperature conditioned for 4 hours prior to firing. Weather conditions were clear, approximately 53° F. with 3 to 8 mile per hour winds. After qualifying the barrels, each of the four test samples were fired, followed by the control sample. This procedure was followed at each temperature. The control lot was fired last to serve as a final check to assure there were no equipment malfunctions during the course of fire. Requirements for M855 dispersion testing state that the horizontal and vertical standard deviation must be less than 6.0 in. for a 30 round target fired at a 600 yard range. For this test however, 10 round targets were fired instead of 30 round targets due to the availability of cartridges. A comparison was then made between each of the sample cartridges and the regular M855 cartridges to assess the performance of each prototype. After firing was completed, results obtained with each barrel were averaged separately (Tables 7 through 9) and then combined to obtain an overall average. These overall values, shown in Tables 10 through 12 were then used as the basis for comparison. The score factors shown in these tables were determined by calculating the percent difference between the best performer and each other sample. In this case, the best performer was whichever sample showed the smallest dispersion in the category being evaluated. These categories included mean radius, horizontal standard deviation, vertical standard deviation, and extreme spread at each of the three temperatures. Results obtained at each temperature were then combined in order to identify the best overall performer. This was accomplished by adding the score factors calculated at each temperature (Table 19). Each sample was then ranked according to this final score with the lowest score receiving the highest ranking. It is interesting to note that both TRI samples which showed the largest dimensional variation during manufacture, also exceeded the performance of the standard M855 cartridges. More importantly, the extreme temperatures (−65° F. and +125° F.) had no significant effect on the performance of the samples. This would indicate that the thermal expansion or contraction of the cores was not enough to adversely affect the fit between the core, jacket, and penetrator.

TABLE 13

600 YARD AMBIENT TEMPERATURE DISPERSION RESULTS

| SAMPLE | NO. RDS. FIRED | MEAN RADIUS (in.) | HORIZ. DEV. (in.) | VERT. DEV. (in.) | EXTREME SPREAD (in.) |
|---|---|---|---|---|---|
| TRI#1 | | | | | |
| Barrel 352420 | 10 | 5.56 | 4.30 | 5.47 | 21.85 |
| | 10 | 7.38 | 7.35 | 4.60 | 23.70 |
| | Average: | 6.47 | 5.82 | 5.03 | 22.77 |
| Barrel 352723 | 10 | 5.01 | 5.11 | 2.93 | 16.25 |
| | 10 | 6.44 | 4.90 | 5.27 | 17.35 |
| | Average: | 5.73 | 5.01 | 4.10 | 16.80 |
| TRI#2 | | | | | |
| Barrel 352420 | 10 | 7.45 | 7.28 | 4.17 | 22.45 |
| | 10 | 6.84 | 5.58 | 5.25 | 20.00 |
| | Average: | 7.15 | 6.43 | 4.71 | 21.22 |
| Barrel 352723 | 10 | 6.79 | 4.43 | 6.29 | |
| | 10 | 7.56 | 4.97 | 7.09 | 24.25 |
| | Average: | 7.18 | 4.70 | 6.69 | |
| Control | | | | | |
| Barrel 352420 | 10 | 9.82 | 7.60 | 8.63 | 29.55 |
| | 10 | 4.86 | 4.06 | 4.38 | 16.30 |
| | Average: | 7.34 | 5.83 | 6.49 | 22.92 |
| Barrel 352723 | 10 | 7.27 | 4.51 | 7.42 | 25.15 |
| | 10 | 6.72 | 5.27 | 6.96 | 27.95 |
| | Average: | 6.99 | 4.89 | 7.19 | 26.55 |

TABLE 14

600 YARD HIGH TEMPERATURE (+125° F.) DISPERSION RESULTS

| SAMPLE | NO. RDS. FIRED | MEAN RADIUS (in.) | HORIZ. DEV. (in.) | VERT. DEV. (in.) | EXTREME SPREAD (in.) |
|---|---|---|---|---|---|
| TRI#1 | | | | | |
| Barrel 352420 | 10 | 8.20 | 8.61 | 4.90 | 30.30 |
| | 10 | 9.37 | 7.31 | 7.23 | 24.10 |
| | Average: | 8.78 | 7.96 | 6.07 | 27.20 |
| Barrel 352723 | 10 | 5.22 | 4.09 | 4.33 | 14.35 |
| | 10 | 5.30 | 5.42 | 2.93 | 17.20 |
| | Average: | 5.26 | 4.76 | 3.63 | 15.77 |
| TRI#2 | | | | | |
| Barrel 352420 | 10 | 10.32 | 8.29 | 8.52 | 30.15 |
| | 10 | 5.74 | 5.07 | 4.01 | 15.55 |
| | Average: | 8.03 | 6.68 | 6.27 | 22.85 |
| Barrel 352723 | 10 | 4.89 | 4.05 | 3.85 | 15.10 |
| | 10 | 5.49 | 4.71 | 4.42 | 10.85 |
| | Average: | 5.19 | 4.38 | 4.14 | 12.97 |
| Control | | | | | |
| Barrel 352420 | 10 | 11.64 | 13.20 | 7.03 | 45.65 |
| | 10 | 14.64 | 8.93 | 15.44 | 46.45 |
| | Average: | 13.14 | 11.06 | 11.23 | 46.05 |
| Barrel 352723 | 10 | 7.38 | 7.15 | 5.00 | 23.30 |
| | 10 | 7.86 | 6.46 | 5.97 | 21.00 |
| | Average: | 7.62 | 6.80 | 5.48 | 22.15 |

TABLE 15

600 YARD COLD TEMPERATURE (−75° F.) DISPERSION RESULTS

| SAMPLE | NO. RDS. FIRED | MEAN RADIUS (in.) | HORIZ. DEV. (in.) | VERT. DEV. (in.) | EXTREME SPREAD (in.) |
|---|---|---|---|---|---|
| TRI#1 | | | | | |
| Barrel 352420 | 10 | 8.10 | 7.38 | 7.57 | 31.75 |
| | 10 | 7.90 | 6.80 | 6.10 | 22.35 |
| | Average: | 8.00 | 7.09 | 6.84 | 27.05 |
| Barrel 352723 | 10 | 7.40 | 5.73 | 6.73 | 25.05 |
| | 10 | 3.72 | 3.44 | 2.60 | 10.75 |
| | Average: | 5.56 | 4.59 | 4.67 | 17.90 |
| TRI#2 | | | | | |
| Barrel 352420 | 10 | 7.09 | 5.54 | 6.07 | 22.75 |
| | 10 | 5.15 | 4.67 | 4.84 | 21.60 |
| | Average: | 6.12 | 5.10 | 5.46 | 22.17 |
| Barrel 352723 | 10 | 5.67 | 3.56 | 5.77 | 20.30 |
| | 10 | 6.91 | 5.38 | 6.08 | 21.70 |
| | Average: | 6.29 | 4.47 | 5.92 | 21.00 |
| Control | | | | | |
| Barrel 352420 | 10 | 6.58 | 6.11 | 4.14 | 18.80 |
| | 10 | 7.53 | 6.24 | 6.26 | 23.55 |
| | Average: | 7.06 | 6.17 | 5.20 | 21.17 |
| Barrel 352723 | 10 | 6.58 | 3.45 | 7.IO | 24.50 |
| | 10 | 8.50 | 7.20 | 5.97 | 20.80 |
| | Average: | 7.54 | 5.33 | 6.54 | 22.65 |

TABLE 16

CUMULATIVE AMBIENT TEMPERATURE DISPERSION RESULTS

| SAMPLE | MEAN RADIUS (in.) | HORIZ. DEV. (in.) | VERT. DEV. (in.) | SCORE FACTOR |
|---|---|---|---|---|
| TRI #1 | 6.10 | 5.41 | 4.56 | 4.03 |
| TRI #2 | 7.16 | 5.56 | 5.71 | 4.59 |
| Control | 7.16 | 5.36 | 6.84 | 4.82 |

TABLE 17

CUMULATIVE HIGH TEMPERATURE DISPERSION RESULTS

| SAMPLE | MEAN RADIUS (in.) | HORIZ. DEV. (in.) | VERT. DEV. (in.) | SCORE FACTOR |
|---|---|---|---|---|
| TRI #1 | 7.02 | 6.36 | 4.85 | 3.36 |
| TRI #2 | 6.61 | 5.53 | 5.20 | 3.20 |
| Control | 10.38 | 8.93 | 8.35 | 5.12 |

TABLE 18

CUMULATIVE COLD TEMPERATURE DISPERSION RESULTS

| SAMPLE | MEAN RADIUS (in.) | HORIZ. DEV. (in.) | VERT. DEV. (in.) | SCORE FACTOR |
|---|---|---|---|---|
| TRI #1 | 6.79 | 5.84 | 5.75 | 3.69 |
| TRI #2 | 6.20 | 4.78 | 5.69 | 3.33 |
| Control | 7.30 | 5.75 | 5.84 | 3.77 |

TABLE 19

Overall Dispersion Test Results
CUMULATIVE SCORE FACTORS

| SAMPLE | AMBIENT | HOT | COLD | TOTAL | RANK |
|---|---|---|---|---|---|
| TRI #1 | 4.03 | 3.36 | 3.69 | 11.08 | 2 |
| TRI #2 | 4.59 | 3.20 | 3.33 | 11.12 | 3 |
| Control | 4.82 | 5.12 | 3.77 | 13.71 | 5 |

Terminal Ballistic Testing

The Naval Surface Warfare Center, Crane, Ind., conducted testing to assess the terminal performance of the cartridges incorporating TRI#1 and TRI#2 composites against simulated hard and soft targets. Data obtained from these tests was used to identify any shortfalls or improvements of the candidate cartridges as compared to the standard M855 cartridge. The terminal ballistic tests conducted included the following:

Soft Targets
 1) 20% Ballistic gelatin at 10 meters
 2) 20% Ballistic gelatin at 300 meters
 3) 20% Ballistic gelatin behind auto glass at 300 meters
 4) 20% Ballistic gelatin behind auto glass (45 degrees obliquity) at 300 meters
 5) 20% Ballistic gelatin behind a PASGT vest at 300 meters Hard Targets
 1) Determine R50 range against 12.7 mm aluminum plate
 2) Determine R50 range against 3.5 mm NATO plate
 3) Kevlar® Helmets at 1,000 meters*
 4) 8" concrete blocks at 100 meters
   * Test was conducted at 50 meters with downloaded cartridges.

Ballistic Gelatin at 10 Meters

Figure 31:
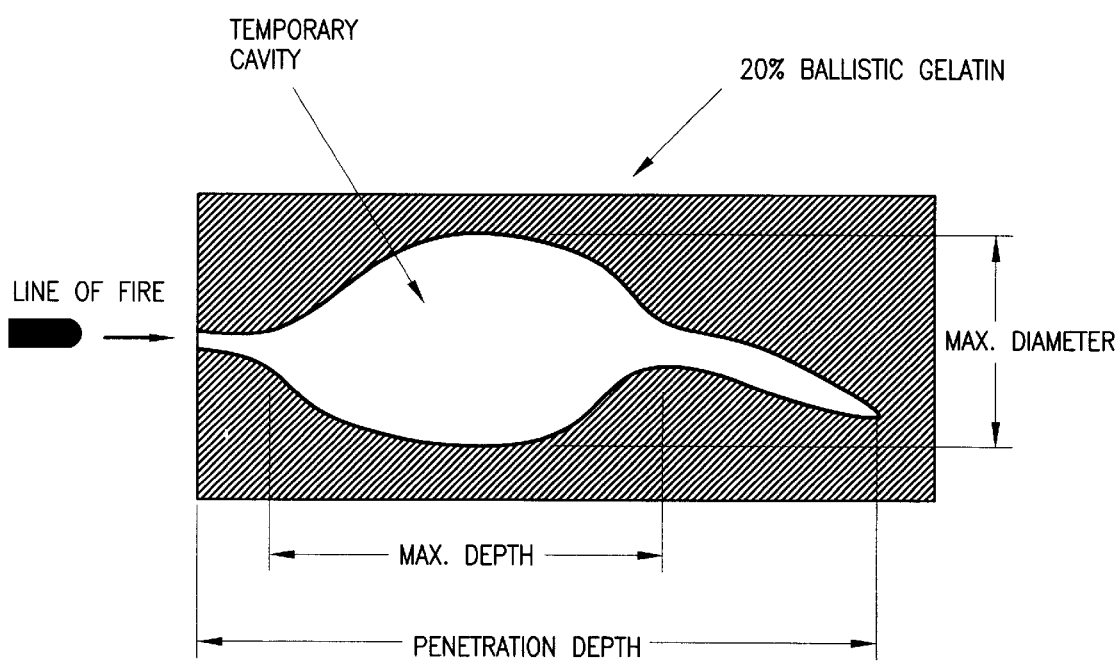
FIG. 31 shows an illustration of penetration depth, length and height of the temporary cavity made by firing of projectiles of the present invention into ballistic gelatin.

Soft target testing against 20% ballistic gelatin blocks positioned at 10 meters from the weapon was conducted with each sample. Prior to testing, blocks were temperature conditioned to 50° F. for 36 hours and calibrated using the BB penetration criteria. This criteria states that a .177 caliber BB at a velocity of 595±15 fps should penetrate the block to a depth of 1.5±0.25 in. The weapon used for the test was a M16A2-E3 rifle which was shoulder fired. Velocity for each round fired was recorded at a distance of 15 ft. from the muzzle. After firing each test round, penetration depth as well as the length and height of the temporary cavity were measured. Four valid rounds of each cartridge type were fired. A round was considered valid if the projectile fragments and the entire cavity were contained within the block and did not contact the cavity formed from a preceding shot. These measurements are illustrated in FIG. 31.

Results showed the TRI#1 cartridges most closely matched the performance of the reference M855 cartridge in terms of cavity dimensions while the TRI#2 provided the closest match in terms of penetration depth. The TRI#1 and TRI#2 samples averaged 13.4 in. and 12.2 in of penetration, respectively. Score factors were determined by totaling the average values for penetration depth and cavity dimensions and then calculating the percent difference between the largest total and totals for the remaining samples. This method assumes that the largest cavity dimensions indicate the best performance.

TABLE 20

10 Meter Ballistic Gelatin Test Results

| | | | | Temporary Cavity | | |
|---|---|---|---|---|---|---|
| Sample | Rd No. | Vel @ 15 Ft. (fps) | Penetration Depth (in.) | Max. Dia. (in.) | Max. Depth (in.) | Score Factor |
| TRI#1 | 1 | 3081 | 13.9 | 4.2 | 8.0 | |
| | 2 | 3098 | 15.4 | 4.4 | 8.2 | |
| | 3 | 3080 | 14.5 | 5.0 | 5.5 | |
| | 4 | 3074 | 9.8 | 5.2 | 7.3 | |
| | AVG: | 3083 | 13.4 | 4.7 | 7.2 | 1.19 |

TABLE 20-continued

10 Meter Ballistic Gelatin Test Results

| | | | | Temporary Cavity | | |
|---|---|---|---|---|---|---|
| Sample | Rd No. | Vel @ 15 Ft. (fps) | Penetration Depth (in.) | Max. Dia. (in.) | Max. Depth (in.) | Score Factor |
| TRI#2 | 1 | 3041 | 13.0 | 5.8 | 7.8 | |
| | 2 | 3090 | 10.8 | 5.4 | 7.0 | |
| | 3 | 3059 | 12.5 | 6.0 | 8.7 | |
| | 4 | 3025 | 12.4 | 6.2 | 8.4 | |
| | AVG: | 3054 | 12.2 | 5.8 | 7.9 | 1.16 |
| Lead | 1 | 3073 | 12.9 | 5.0 | 6.5 | |
| | 2 | 3070 | 9.0 | 4.7 | 7.0 | |
| | 3 | 3085 | 11.9 | 5.1 | 6.8 | |
| | 4 | 3104 | 12.4 | 5.0 | 8.1 | |
| | AVG: | 3083 | 11.5 | 4.9 | 7.1 | 1.28 |

*Bullet core broke skin of gelatin at back end of block

Ballistic Gelatin at 300 Meters

This test was conducted in the same manner as the 10 meter gelatin test with the exception of the target range which was increased to 300 meters. In addition, this test consisted of only three valid rounds per cartridge type and projectile velocity was obtained with a WEIBEL Doppler Radar system. Results of the test are shown below in Table 21.

TABLE 21

300 Meter Ballistic Gelatin Test Results

| | | Vel @ | Impact | | Temporary Cavity | | |
|---|---|---|---|---|---|---|---|
| Sample | Rd No. | 15 Ft. (fps) | Vel. (fps) | Penetration Depth (in.) | Max. Dia. (in.) | Max. Depth (in.) | Score Factor |
| TRI#1 | 1 | 3068 | 2162 | 13.2 | 3.4 | 8.3 | |
| | 2 | 2999 | 2153 | 14.5 | 3.0 | 5.8 | |
| | 3 | 3013 | 2769 | 16.3 | 3.6 | 7.9 | |
| | AVG: | 3027 | 2361 | 14.6 | 3.3 | 7.3 | 1.11 |
| TRI#2 | 1 | 3038 | 2003 | 12.0 | 2.7 | 8.0 | |
| | 2 | 3027 | 2040 | 12.0 | 2.7 | 8.7 | |
| | 3 | 3037 | 2143 | 14.5 | 3.5 | 5.2 | |
| | AVG: | 3034 | 2062 | 12.8 | 3.0 | 7.3 | 1.21 |
| Lead | 1 | 3040 | 2129 | 15.8 | 4.0 | 8.0 | |
| | 2 | 3045 | 2082 | 16.3 | 3.5 | 8.5 | |
| | 3 | 3070 | 2177 | 15.6 | 3.8 | 8.1 | |
| | AVG: | 3052 | 2129 | 15.9 | 3.8 | 8.2 | 1.00 |

Ballistic Gelatin at 300 Meters Protected by PASGT Vest

This test was conducted in the same manner as the 300 meter gelatin test with the addition of a PASGT Kevlar® vest which was positioned directly in front of the gelatin block. The results of this test are summarized below in Table 22. In this test, the maximum average penetration depth of the lead core projectile was met or exceeded by each of the samples tested.

TABLE 22

Ballistic Gelatin Protected w/ PASGT Vest @ 300 m

| Sample | Rd No. | Vel @ 15 Ft. (fps) | Impact Vel. (fps) | Penetration Depth (in.) | Temporary Cavity Max. Dia. (in.) | Temporary Cavity Max. Depth (in.) | Score Factor |
|---|---|---|---|---|---|---|---|
| TRI#1 | 1 | 2976 | 2076 | 12.8 | 3.4 | 3.5 | |
|  | 2 | 2990 | 2091 | 13.8 | 3.3 | 4.7 | |
|  | 3 | 2994 | 2097 | 14.0 | 4.4 | 6.4 | |
|  | AVG: | 2987 | 2088 | 13.5 | 3.7 | 4.9 | 1.13 |
| TRI#2 | 1 | 3017 | 2102 | 12.0 | 2.0 | 5.0 | |
|  | 2 | 3028 | 2173 | 13.6 | 2.0 | 6.5 | |
|  | 3 | 3019 | 2174 | 13.0 | 2.5 | 8.0 | |
|  | AVG: | 3021 | 2150 | 12.9 | 2.2 | 6.5 | 1.17 |
| Lead | 1 | 3031 | 2097 | 11.0 | 4.3 | 4.1 | |
|  | 2 | 2988 | 2053 | 14.5 | 4.0 | 10.6 | |
|  | 3 | 3001 | 2086 | 13.3 | 2.7 | 4.1 | |
|  | AVG: | 3007 | 2079 | 12.9 | 3.7 | 6.3 | 1.09 |

Auto Glass (0° Obliquity) with Ballistic Gelatin at 300 meters

The purpose of this test was to document the effects of automobile windshield glass on bulled integrity and penetration depth. Initially, the glass was positioned at a range of 300 meters at 0 degrees obliquity, or perpendicular to the line of fire. The windshield consisted of single layer autoglass, 0.219" thick. In addition, a gelatin block was placed 18 in. behind the glass. Three valid rounds were fired with each cartridge type. For this test, a round was considered valid when the point of impact was not less than 2.5 in from another bullet impact and the temporary cavity did not impact any part of a cavity formed from a previous round. Results of this test are summarized in Table 23. The TRI#1 samples achieved the greatest penetration depth while the cavities produced by the lead projectiles were slightly larger than the cavities produced whith the other samples. It was also noted that one or two projectiles of each type fragmented upon impact with the glass. Cavities in the gelatin block were then based on the impact of these fragments.

For the second part of this test, the auto glass was repositioned at 45 degrees obliquity (top of the glass tilted away from the muzzle). Results of this test are summarized in Table 24. In this test, the TRI#1 sample achieved the greatest penetration depth, followed closely by the lead projectiles. The TRI#1 and lead projectiles also produced the largest cavities of all the samples tested. In addition, all of the projectiles tested fragmented upon impact with the glass. In one instance the TRI#2 sample fragmented into numerous pieces and could not be recovered.

TABLE 23

Auto Glass (0° Obliquity) with Ballistic Gelatin at 300 meters

| Sample | Rd No. | Vel @ 15 Ft. (fps) | Impact Vel. (fps) | Penetration Depth (in.) | Temporary Cavity Max. Dia. (in.) | Temporary Cavity Max. Depth (in.) | Score Factor |
|---|---|---|---|---|---|---|---|
| TRI#1 | 1 | 3011 | 2006 | 11.0 | 2.5 | 6.2 | |
|  | 2 | 3088 | 2085 | 10.4 | 2.5 | 8.0 | |
|  | 3 | 3007 | 1997 | 11.5 | 2.0 | 9.0 | |
|  | AVG: | 3035 | 2029 | 11.0 | 2.3 | 7.7 | 1.12 |
| TRI#2 | 1 | 2995 | 2016 | 8.0 | 2.0 | 6.0 | |
|  | 2 | 3021 | 2023 | 7.5 | 2.5 | 6.5 | |
|  | 3 | 3010 | 1985 | 9.3 | 2.5 | 8.5 | |
|  | AVG: | 3009 | 2008 | 8.3 | 2.3 | 7.0 | 1.34 |
| Lead | 1 | 2981 | 2015 | 10.4 | 4.0 | 8.5 | |
|  | 2 | 3017 | 2055 | 10.0 | 3.0 | 8.0 | |
|  | 3 | 3058 | 2062 | 12.0 | 2.5 | 10.0 | |
|  | AVG: | 3019 | 2044 | 10.8 | 3.2 | 8.8 | 1.03 |

TABLE 24

Auto Glass (45° Obliquity) with Ballistic Gelatin at 300 meters

| Sample | Rd No. | Vel @ 15 Ft. (fps) | Impact Vel. (fps) | Penetration Depth (in.) | Max. Dia. (in.) | Max. Depth (in.) | Score Factor |
|---|---|---|---|---|---|---|---|
| TRI#1 | 1 | 3004 | 2048 | 5.2 | 3.0 | 4.0 | |
|  | 2 | 3002 | 2065 | 6.0 | 3.5 | 4.5 | |
|  | 3 | 3042 | 2057 | 9.0 | 2.7 | 6.0 | |
|  | AVG: | 3016 | 2057 | 6.7 | 3.1 | 4.8 | 1.00 |

TABLE 24-continued

Auto Glass (45° Obliquity) with Ballistic Gelatin at 300 meters

| Sample | Rd No. | Vel @ 15 Ft. (fps) | Impact Vel. (fps) | Penetration Depth (in.) | Max. Dia. (in.) | Max. Depth (in.) | Score Factor |
|---|---|---|---|---|---|---|---|
| TRI#2 | 1 | 3021 | 1963 | 5.0 | 2.0 | 3.5 | |
|  | 2 | 3011 | 2006 | 4.7 | 1.4 | 3.5 | |
|  | 3 | 3019 | 1996 | | | | |
|  | AVG: | 3017 | 1988 | 4.8 | 1.7 | 3.5 | 1.46 |
| Lead | 1 | 3021 | 2069 | 6.0 | 4.0 | 5.0 | |
|  | 2 | 3021 | 2041 | 5.7 | 2.2 | 5.0 | |
|  | 3 | 3028 | 2056 | 6.0 | 2.4 | 5.3 | |
|  | AVG: | 3023 | 2055 | 5.9 | 2.9 | 5.1 | 1.05 |

R50 vs. 12.7 mm Aluminum Plate

Set-up for this test included a 5.56 mm accuracy barrel and Remington M700 receiver mounded in a v-slide. The target plate was rigidly mounted at 0 degrees obliquity to the weapon. A Doppler radar tracking system was also used to record projectile velocity, acceleration, and time of flight from the muzzle to target. For this test, Army penetration criteria was used which states that any cracking of the target plate qualifies as a complete penetration. Initial results showed all samples achieved complete penetration (CP) of the target at 350 meters so the target was repositioned at 355 meters. At this range, the TRI#1 sample achieved 5 CPs for 5 rounds fired whiled the M855 cartridge achieved 3 CPs for 6 rounds fired. The target was then moved back to 360 meters. At this range, the TRI#2 sample had no CPs after four rounds fired. The TRI#1 samples achieved CPs for 6 rounds fired. The target plate was then moved back to 365 meters where the TRI#1 sample achieved 2 CPs for 6 rounds fired. Based on these results, the R50 range for each sample was determined. The TRI#2 and M855 cartridges each achieved an R50 range of 355 meters. The TRI#1 sample had the greatest R50, 363 meters. Muzzle velocity and V50 velocity, which is the impact velocity at the R50 range were also determined for each sample. Results of this test are shown below in Table 25. The score factors in the right side column were determined by calculating the percentage difference between the farthest R50 range (363 meters for the TRI#1 sample) and the R50 range for each other sample. As in the previous tables, the lower sore factor indicates better performance.

TABLE 25

R50 vs. 12.7 mm Aluminum Plate

| Sample | Muzzle Velocity (fps) | V50 Velocity (fps) | R50 Range (m) | Score Factor |
|---|---|---|---|---|
| TRI #1 | 3047 | 1963 | 363 | 1.00 |
| TRI #2 | 3056 | 1910 | 355 | 1.02 |
| Lead | 3060 | 2004 | 355 | 1.02 |

R50 vs. 3.5 mm Mild Steel Plate

The set-up and equipment used for this test was the same as used for the previous test against the aluminum plate. The target plate was originally positioned at 600 meters from the weapon. Cartridges were then loaded and fired single shot. After each shot the target was inspected and the shot was determined to be valid or invalid. To be considered valid, a shot had to hit the plate not less than 1 in. from the nearest hole, support, or edge of the plate. For each valid shot, the penetration, either full or partial was assessed. This procedure was repeated with each sample. After firing the test rounds, the target range was increased until the R50 range was established. Again, the score factors in the right side column were determined by calculating the percentage difference between the farthest R50 range and the R50 range for each other sample. As in the previous tables, a lower score factor indicates better performance.

TABLE 26

R50 vs. 3.5 mm Mild Steel Plate

| Sample | R50 Range | Score Factor |
|---|---|---|
| TRI #1 | 710 m | 1.25 |
| TRI #2 | 620 m | 1.43 |
| Lead | 680 m | 1.30 |

Concrete Block Penetration

The objective of this test was to compare the penetration performance of the test cartridges when fired into concrete blocks positioned at a range of 50 meters from the weapon. Targets consisted of regular 2-core concrete blocks rigidly mounted on top of a target platform. Blocks were held in place with a ¼" steel bracket positioned over the block and bolted to the platform. Six valid shots (2 per block) were fired with each type of cartridge. A shot was considered valid if it impacted a core not previously shot and the bullet was more than 1.5 in. from the edge or center of the block. Each of the test cartridge samples completely penetrated the front wall of the target. The only projectiles to completely penetrate the block were the standard lead projectile; 2 of the 6 rounds fired achieved complete penetration. On average TRI#2 sample produced the least damage.

Kevlar® Helmet Penetration at 1,000 Meters

This test was conducted to compare the performance of the test projectiles and standard projectiles when fired at Kevlar® lined combat helmets at a range of 1,000 meters. For this test however, targets were positioned at a reduced range of 50 meters in order to increase the hit probability and reduce the number of rounds required for this test. Cartridges were then downloaded to simulate the 1,000 meter velocity at a 50 meter range. It was determined that the 5.56 mm M855 type bullet would have a residual velocity of approximately 261 mps (856 fps). To achieve this velocity, cartridges were loaded with 3.8 grains of Bullseye powder. However, due to the large amount of free case volume resulting from the reduced propellant load, projectile velocities showed slightly more variation than the standard cartridges. Five valid rounds of each type were then fired at the helmet. One round of each sample was fired at the front, top, back, left side, and right side of the helmet. Impact velocities for each of the samples were within 3.5% of the desired velocity of 261 mps. Overall, the TRI#1 and TRI#2 samples achieved the best results, penetrating the helmet at each of the five orientations. The lead projectiles on the other hand, achieved penetration on only 3 of 5 shots even though all impact velocities were within 3.5% of the desired velocity.

TABLE 27

Kevlar ® Helmet Penetration at 1,000 Meters

| Sample | Point of Impact | Muzzle Velocity (mps) | Impact Velocity (mps) | Complete Penetration |
|---|---|---|---|---|
| TRI #1 | Top | 281 | 271 | Yes |
| | Back | 265 | 254 | Yes |
| | Rt. Side | 266 | 253 | Yes |
| | Lft. Side | 252 | 243 | Yes |
| | Front | 272 | 260 | Yes |
| | AVG: | 267 | 256 | |
| TRI #2 | Top | 277 | 268 | Yes |
| | Back | 278 | 268 | Yes |
| | Rt. Side | 262 | 252 | Yes |
| | Lft. Side | 292 | 278 | Yes |
| | Front | 270 | 260 | Yes |
| | AVG: | 276 | 265 | |
| Lead | Top | 280 | 270 | Yes |
| | Back | 276 | 265 | Yes |
| | Rt. Side | 268 | 260 | No |
| | Lft. Side | 279 | 267 | Yes |
| | Back | 262 | 252 | No |
| | AVG: | 273 | 263 | |

Soft Recovery Test

This test was conducted to obtain information on the condition of the projectiles after being fired into a simulated target berm. The target berm in this case consisted of sandbags which were positioned 100 meters from the gunner. A witness panel was placed behind the sand bags to determine if the projectiles completely penetrated the sand bags. After firing 15 to 20 rounds into the berm, the sand was sifted through a screen and the projectile fragments were recovered and photographed. New sandbags were used for each sample tested.

The TRI#1 and TRI#2 cores did not demonstrate the same high degree of fragmentation after impact. A larger percentage of these cores were recovered both within the jackets and in pieces separate from the jackets. The TRI#2 cores demonstrated the least amount of frangibility of all the samples. Several samples of these cartridges were recovered while reasonably still intact.

Lead projectile fragments consisted primarily of jacket pieces and lead chunks which most closely resembled the TRI#1 fragments. The table below shows the average weight of the seven largest recovered core fragments of each type. The TRI#2 projectiles, on average, retained the largest mass of all the samples tested. Although this test was conducted with a limited number of rounds under tightly controlled conditions, this may be an indication of how easily recoverable the materials will be for recycling purposes. A mass comparison of the recovered projectile fragments is shown in Table 28.

TABLE 28

Average Mass of Recovered Projectile Fragments (Grains)

| Sample | Average Mass of Recovered Fragments (Grains) | Score Factor |
|---|---|---|
| TRI #1 | 29.4 | 1.68 |
| TRI #2 | 49.4 | 1.00 |
| Lead | 37.9 | 1.31 |

Toxic Fumes Test

Figure 32:
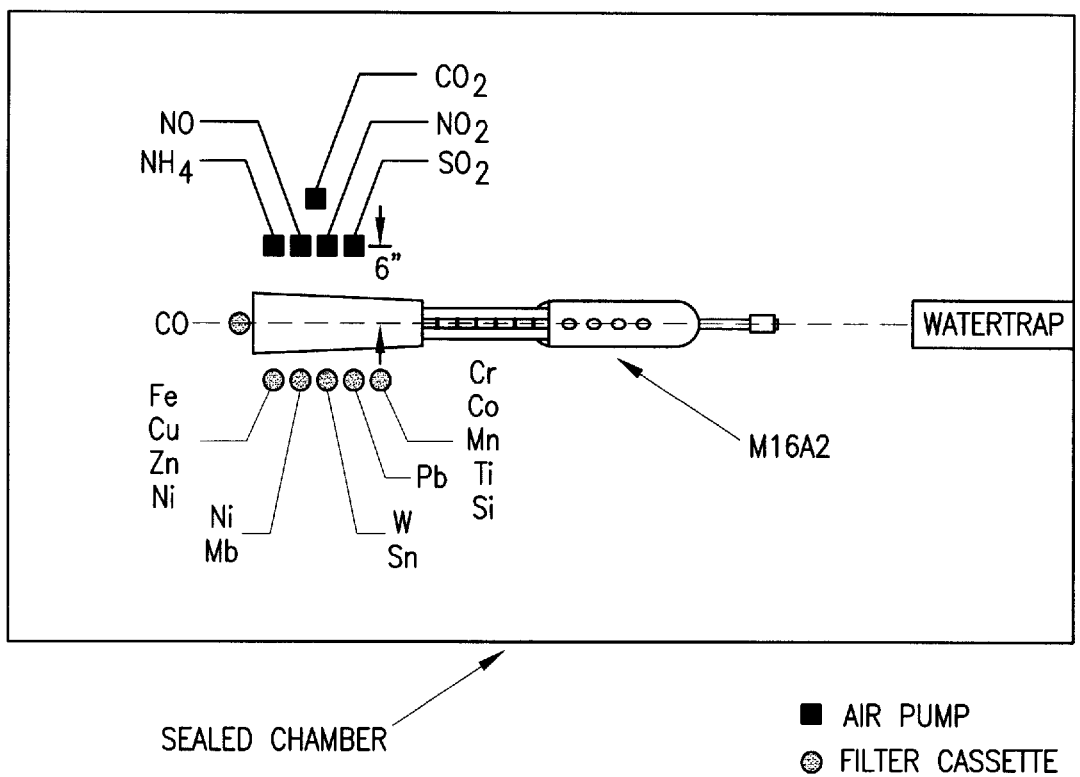
FIG. 32 Set up for toxic fume test (top view).

Toxic fumes testing was conducted at the ARDEC Armament Technology Facility. This test assessed the gaseous and particulate emissions from the cartridges when fired. For this test, an M16A2 rifle was mounted in a hard stand enclosed in a sealed chamber. Five firing trials were conducted using each of the five cartridge samples. For each trial, 30 rounds of ammunition were loaded into the magazine and fired in ten 3-round bursts with 3–5 seconds between bursts. Gas and metal concentrations were monitored during the firing and for a 30-minute period after the firing of each trial was completed. Sampling points were located 6 in. to the left and right of the buttstock as well as directly behind the buttstock. These locations, which are illustrated in FIG. 32, were chosen to simulate the position of the gunner's head while firing. Particulate concentrations were then compared to the Maximum threshold limit values (MTLV) as determined by the American Conference of Government Industrial Hygienists.

Preliminary analytical data showed some significant findings. First of all, the lead emissions from each of the four test cartridge samples were reduced to approximately one half that of the standard service cartridge. The MTLV for lead is 0.05 mg/m$^3$. Results showed the lead concentrations from the service cartridges averaged approximately 0.5 mg/m$^3$, 10 times the MTLV. The concentrations emitted from the test cartridges averaged approximately 0.25 mg/m$^3$. Although this still exceeds the MTLV, there is a noticeable reduction of lead emissions. Also, silica, which is a primary component of the nylon used in the TRI samples, was detected at concentrations of less than 1% of the MTLV. Laboratory data also showed that concentrations of sulfur dioxide, iron, and nickel fell well below the MTLV for each sample.

Non-Lead Core Materials Evaluation Conducted by Department of Energy—Oak Ridge National Laboratory (ORNL)

The objective of this effort was to evaluate, in detail, the properties, formability, and stability of non-toxic materials proposed to be used as projectile cores. A laboratory study was conducted at ORNL to compliment the larger manufacturing and testing effort described in this report. Issues such as density hardness, elastic behavior, and chemical compatibility were examined. The following presents a summary of the results from this study.

Mechanical Properties

Samples of each material were tested in compression to determine strength, modulus, and elastic behavior. A load was applied to the ends of the core samples at a rate of 0.02 in/min. Load versus displacement information was recorded along with information about the deformation and failure of the material. Hardness was then measured in Brinell B using a drop hammer technique with a large diameter ball. Four measurements were taken on the polished cross sections on three each of the material samples and the twelve values were then averaged. Calculated mechanical properties are shown below.

TABLE 29

Summary of Mechanical Properties of Non-Lead Materials

| Sample | Density (g/cc) | Compressive Strength (ksi) | Compressive Modulus (Msi) | Hardness (Brinell B) |
|---|---|---|---|---|
| TRI #1 | 10.35 + 0.81 | 10.09 + 0.02 | 1.01 + 0.12 | 165.7 + 50.2 |
| TRI #2 | 8.80 + 1.13 | 9.74 + 0.41 | 0.79 + 0.08 | 145.8 + 39.1 |
| Pb-6% Sb* | 10.9 | 4.1 | 4.0 | 90 (approx.) |

*Used a reference material

In addition to these tests, the effects of compressing the materials to a larger diameter at different pressures were studied. Three specimens of each material were pressed to a diameter of 0.224" at pressures of 50, 60, and 75 ksi. Each specimen was weighed and measured prior to compression. Parts were inserted into a die and a load was applied to both ends of the sample. The load was applied until the punch movement stopped and was then held for 5 seconds. When the load was removed the part was immediately ejected, weighed and measured. Samples were measured again four weeks later to assess the time dependent elastic response of the materials. The diameters of the TRI#1 samples expanded 0.02 to 0.04 in. while the TRI#2 sample diameters increased approximately 0.02 in. over the four week period.

TABLE 30

Recompression Densities

| Sample | Density (50 Ksi) (g/cc) | Density (60 Ksi) (g/cc) | Density (75 Ksi) (g/cc) |
| --- | --- | --- | --- |
| TRI #1 | 10.36 + 0.36 | 10.55 + 0.28 | 10.43 + 0.17 |
| TRI #2 | 8.57 + 0.31 | 9.02 + 0.31 | 8.51 + 0.58 |

Chemical Compatibility

Core samples were also exposed to chemicals which would likely be encountered during manufacture, handling, and processing. These included water, acetone, isopropyl alcohol, and ethyl acetate. Individual cores were weighed, measured, and visually examined prior to exposure. Samples were then placed in a 15 mL Nalgene bottle containing 10 mL of the solvent. After 24 hours of submersion the samples were removed, dried, weighed and visually examined. Samples were then quickly resubmerged for an additional 4 days after which time the samples were again weighed and examined. Overall, in terms of weight change and surface texture, solvents had little effect on the TRI#1 and TRI#2 samples. A summary of the chemical compatibility test results are provided below.

TABLE 31

Chemical Compatibility Results

| Sample | Initial Weight (grams) | Weight (24 hrs.) (grams) | Weight (5 days) (grams) | Weight Change (grams) | Surface Change |
| --- | --- | --- | --- | --- | --- |
| ACETONE: | | | | | |
| TRI#1 | 2.048 | 2.048 | 2.048 | 0.0 | No change |
| TRI#2 | 1.811 | 1.811 | 1.811 | 0.0 | No change |
| ETHYL ACETATE: | | | | | |
| TRI#1 | 2.013 | 2.014 | 2.013 | 0.0 | Slight discoloration |
| TRI#2 | 1.775 | 1.775 | 1.776 | +0.001 | No change |
| ISOPROPYL ALCOHOL: | | | | | |
| TRI#1 | 1.918 | 1.919 | 1.920 | +0.002 | Surface washed out |
| TRI#2 | 1.849 | 1.849 | 1.849 | 0.0 | No change |
| WATER: | | | | | |
| TRI#1 | 2.016 | 2.015 | 2.016 | 0.0 | No change |
| TRI#2 | 1.832 | 1.831 | 1.832 | 0.0 | No change |

Conclusions Recommendations

Projectile performance was evaluated based on existing requirements, where applicable, or on the basis of the best overall performer during a particular test. Score factors were then assigned to each candidate for each test. No score factors were given for the Kevlar® helmet penetration test due to the variation in projectile velocities resulting from the reduced propellant charges, which affected terminal performance. After testing was completed, the scores were totaled and are presented in the tables below. The first table provides a comparison of the dimensional uniformity of the cores and assembled projectiles with respect to specification dimensional requirements. The second table shows a comparison of the ballistic performance of each candidate. In general, the best performers in this ballistic performance category had either the smallest dispersion or achieved the most significant target effects in terms of soft target damage or hard target penetration.

Based on the tests conducted and the scoring methodology used, the TRI#1 tungsten-Nylon 12® composite is an acceptable substitute for lead antimony. Any future efforts may expand on the testing already conducted and include rough handling, weapon compatibility, and barrel erosion testing.

| Criteria | TRI#1 | TRI#2 | Control |
| --- | --- | --- | --- |
| Core Dimensions | 13.3 | 24.3 | 16.8 |
| Bullet Inspection | 5.06 | 10.73 | 5.72 |
| Bullet Inspection (Fixed Gage) | 1.33 | 1.56 | 0.07 |
| Total (Dimensions) | 19.69 | 36.59 | 22.59 |

TABLE 32

Final Score and Ranking

| Criteria | TRI#1 | TRI#2 | Control |
| --- | --- | --- | --- |
| Dispersion | 11.08 | 11.12 | 13.71 |
| Gelatin @ 10m | 1.19 | 1.16 | 1.28 |
| Gelatin @ 300m | 1.11 | 1.21 | 1.00 |
| Gelatin/PASGT Vest | 1.13 | 1.17 | 1.09 |
| Gelatin/Auto Glass | 1.12 | 1.34 | 1.03 |
| Gelatin/Auto Glass (45) | 1.00 | 1.46 | 1.05 |
| R50 Al Plate | 1.00 | 1.02 | 1.02 |
| R50 Steel Plate | 1.25 | 1.43 | 1.30 |
| Recovery | 1.68 | 1.00 | 1.31 |
| Total (Ballistics) | 20.56 | 20.91 | 22.79 |

EXAMPLE V

Compounding Processes

Two compounding processes are applicable for the production of high density composite materials, namely batch processing and continuous processing. Batch processing utilizes a Brabender or Banbury type batch mixer and continuous processing utilizes a single or double screw compounding-extruder machine. Each compounding process used to produce tungsten powder/Nylon 12® composite material is described below.

Batch Compounding Process:

The first step of this process is to prepare a tungsten powder mixture comprising a 2 to 40 micron particle size. Then, stainless steel fibers are prepared with a length of 0.125 inches and a diameter of 75 microns and Nylon 12® fine powder material is prepared with a 0 to 80 micron particle size.

A Brabender or Banbury batch mixer is heated to the melt temperature of Nylon 12®(480 degrees F.) and a measured quantity of Nylon 12® powder is introduced into the batch mixer and allowed to melt. Meanwhile, the tungsten powder mixture and stainless steel fiber are heated to 480 degrees F.

A measured quantity of tungsten powder mixture is gradually added to the Nylon 12® material in the batch mixer until the required material mix ratio is achieved. Then, a measured quantity of stainless steel fiber is gradually added to the tungsten powder/Nylon 12® mixture in the batch mixer until the required high density composite material mix ratio is achieved.

The molten high density composite material is fed into a screw extruder. The high density composite material is extruded as thin diameter rod from the extruder into a quenching water bath. The cooled solidified high density composite material extruded rod is fed from the quenching bath into a pelletizer, which cuts the extruded high density composite material rod into pellets. The pellets are then suitable for injection molding or other methods for molding the composition into a variety of shapes.

Continuous Compounding Process:

The tungsten powder, stainless steel fiber, and Nylon 12® powder are prepared according to the specifications described for the batch compounding process above.

A single or double screw continuous compounding-extruder machine is heated to the melt temperature of Nylon 12®(480 degrees F.). The tungsten powder mixture and stainless steel fiber are heated to 480 degrees F.

A metered quantity of Nylon 12® powder and tungsten powder mixture is introduced into the front end of the continuous compounder-extruder. A metered quantity of tungsten powder mixture and stainless steel fiber is added into the continuous compounder-extruder at one or more fill ports located down stream on the compounder until the required high density composite material mix ratio is achieved.

The high density composite material is extruded as thin diameter rod from the compounder-extruder into a quenching water bath. The cooled solidified high density composite material extruded rod is fed from the quenching bath into a pelletizer which cuts the extruded high density composite material rod into pellets.

EXAMPLE VI

Tungsten Composites for use in Recreational Applications

Fishing Hardware

Figure 24:
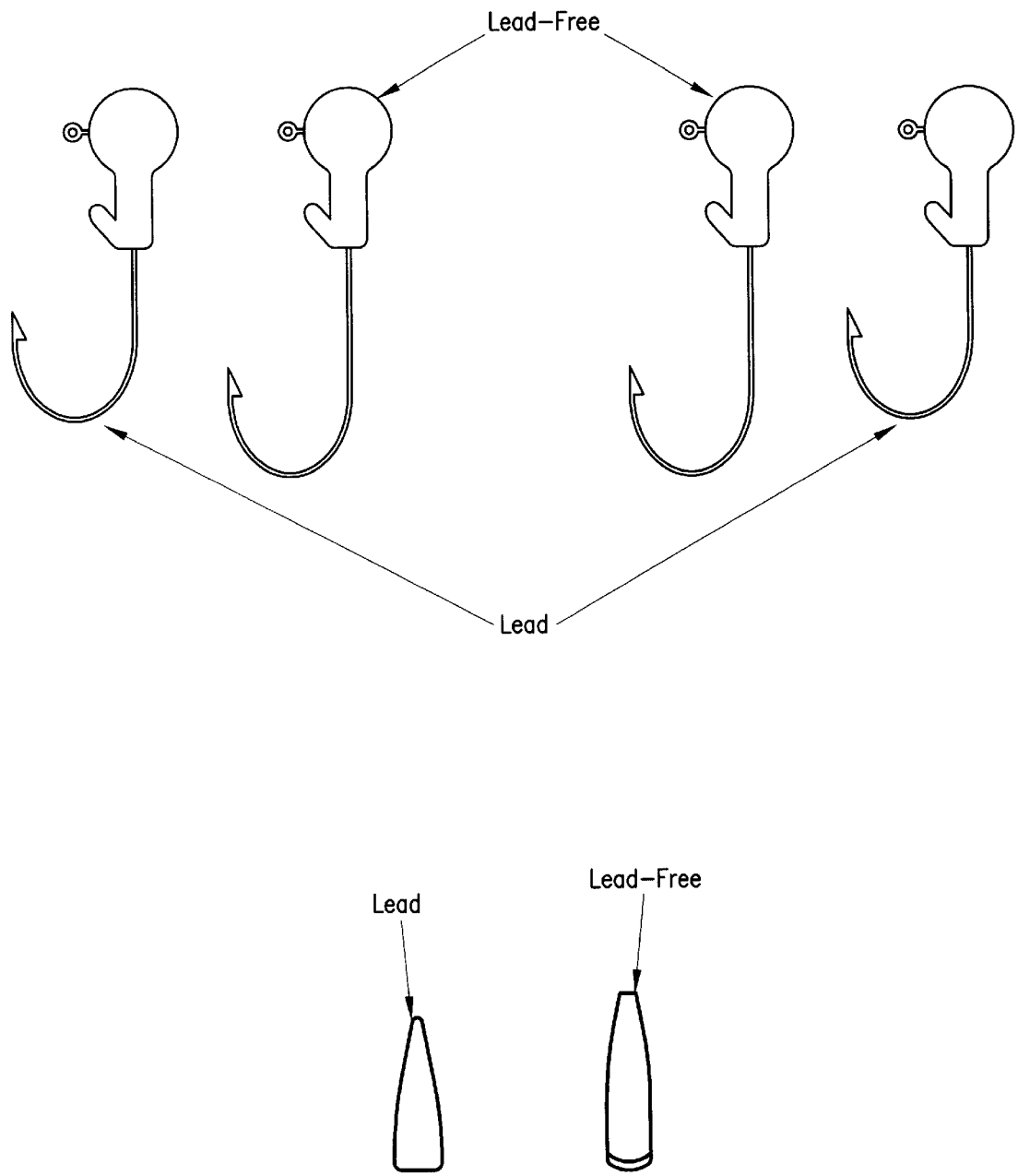
FIG. 24 shows non-toxic lead-free fishing weight prototypes and their lead counterparts.

Lead sinkers of all types are currently used in a variety of fishing hardware. This application of the present invention is ideal from a commercialization standpoint, since lead poses a toxic danger to wildlife, as well as lakes, rivers and streams. Most sinkers are from about 1/32 to about 1/2 oz., and have been traditionally made of lead. Alternative compositions for sinkers include brass, steel, and iron powder/polymer composites. Such compounds have, however, the disadvantage of having less density, and thus give a bulkier profile to the lure, which may offer negative clues to the fish. Fishing applications include, for example, jigheads, worm weights, crankbait weights, split shot, weighted hooks, jigging spoons, bait walkers and bottom bouncers. The present inventors have constructed jigheads and worm weights utilizing a tungsten powder/Nylon 12® composite. These weights, which have a density of about 11.0 g/cc, are shown in FIG. 24.

Hobby Applications

Figure 25:
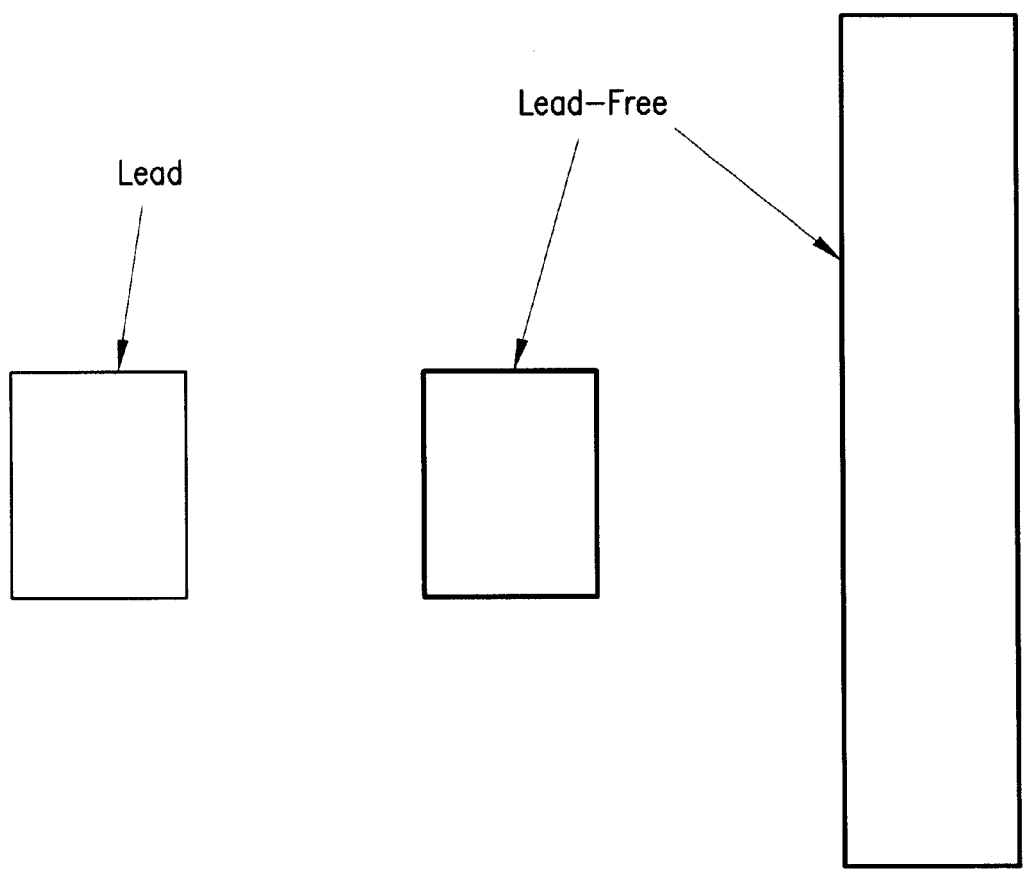
FIG. 25 shows model train weights. A commercially available lead model train add-on weight is shown on the left and a lead-free prototype compression molded by of the present invention is shown in the center, Lead-free bar-stock is shown on the right. The lead-free train weights are made of tungsten powder and have a density of 11.0 g/cc.

Hobby Applications represent a further use for the instant compositions. For example, model trains engines depend on having the maximum possible engine weight to prevent wheel slippage. These engines are manufactured to scale and space inside these small models is limited, so that high density is important in obtaining the desired overall weight in scale with the model proportions. Engine frames molded from this material are one application. Also, "add-on" weights made of the present material would be utilized not only in model train engines, but in train cars as well. FIG. 25 shows a commercially available lead model train add-on weight with a lead-free weight that is made of tungsten powder/nylon and has a density of about 11.0 g/cc.

EXAMPLE VII

Alternative Tungsten Composites Applications

Radiation Shielding

Tungsten is an excellent radiation shield material, but is difficult to work with in solid form. The injection moldable lead replacement according to the present invention solves this problem, since the material may be used to form radiation shield parts for all members of the medical x-ray and gamma ray equipment industry. This high density material has the advantage of superior structural strength when compared to lead. Also, the material may be used to manufacture clothing used by radiation industry workers for protection against the effects of ionizing radiation.

Testing of Sheet Material of Polymeric Material

Sheet material of tungsten composite materials were placed on a piece of x-ray film with 6 pieces of lead of varying thickness up to 0.25 inches. The samples of the present invention were compared to lead of 0.125 inches thick. The samples were irradiated, and the film was developed and assessed for the ability of the samples to prevent film fogging.

In one example, material 0.250 inches thick and comprising the Nylon 12®/polymer mix as set forth above, had a shielding equivalency of approximately that of 0.150 inches of sheet lead. In another example, material 0.50 inches thick, and comprising the Nylon 12® sample with stainless steel fibers as set forth above, yielded an approximate shielding equivalency of 0.187 inches of sheet lead. A third example was 0.375 inches thick and flexible in form, had a shielding equivalency of between about 0.94 and 0.125 inches of lead.

In other tests, samples of the composites of the present invention were tested for their mechanical properties as radiation shield components. Sample A1 was a tungsten/Nylon 12® non irradiated composite; sample A2 was a tungsten/Nylon 12® composite irradiated with 38400 Roentgens; sample B1 was a tungsten/Nylon 12®/stainless steel fiber, non-irradiated composite and sample B2 was a tungsten/Nylon 12®/stainless steel fiber composite irradiated with 38400 Roentgens.

Samples A1, B1, A2 and B2 were conditioned at 25° C. and 50% RH for a period of 48 hours in an environmental chamber prior to testing. The samples were then tested in a universal testing machine using a crosshead control method. The results are presented in Table 33.

|  | A1 | B1 | A2 | B2 |
| --- | --- | --- | --- | --- |
| File Number | L6-67322 | L6-67324 | L6-67323 | L6-67325 |
| Tensile Strength (psi) | 6,306 | 7,257 | 7,088 | 7,698 |
| Yield Strength (psi) | 5,517 | * | 6,694 | * |
| Elongation-0.5 in. (%) | ~1.0 | ~0.5 | ~1.0 | ~0.5 |

* Sample broke before the yield point was reached.

Putty

In another example, a polyurethane resin putty and tungsten powder are mixed with an activator, which cures to form a flexible material. A representative formulation for the putty comprises 2100 grams of tungsten powder (specific gravity=19.35) mixture blended into 300 grams of TECHTHANE 425 polyurethane prepolymer (specific gravity=

1.11). The final mixture has a specific gravity of about 6.3. For use, 100 grams of putty is mixed with 10 grams of ETHACURE 300 curative and allowed to cure at room temperature.

Other thermosetting materials include those listed in Table 34 and Table 35 below. Table 34 lists possible thermoplastic materials that can be filled with the tungsten powder compositions of the present invention. Table 35 shows examples of thermoset materials for use in the present invention.

TABLE 34

Thermoplastic Materials that can be used in the composites of the present invention

| | |
|---|---|
| Acrylics | Polymethyl Methacrylate |
| Homopolymer and Coppolymer Acetals | Polyoxymethylenes |
| Acrylonitrile-Butadiene-Styrene | Monsanto, Dow Chemical, Borg Warnar Chemicals Cycolac tradename Major Supplier |
| Thermoplastic Fluoropolymers | Coflon (polyvinylidene fluoride) |
| Ionomers | Surlyn tradename for DuPont Product |
| Polyamides | Nylons |
| Polyamide-imides | Condensation product of aromatic diamines and trimellitic anhydride |
| Polyacrylates | Polyhydroxyethylmethacrylate |
| Polyetherketones | Amoco Performance Products |
| Polyaryl Sulfones | Amoco Performance Products |
| Polybenzimidazoles | Hoechst Celanese |
| Polycarbonates | Lexan manufactured by G.E. |
| Polybutylene Terephthalates | Valox manufactured by G.E. |
| Polyether imides | General Electric Company |
| Polyether Sulfones | ICI Advanced Materials |
| Thermoplastic Polyimides | Ciba Geigy Corporation |
| Thermoplastic Polyurethanes | Estane Line B.F.Goodrich, Texin Line Bayer |
| Polyphenylene Sulfides | Ryton, Phillips Petroleum |
| Polyethylene | Ultrahigh Molecular Weight and Low Molecular Weight, Hoechst Celanese |
| Polypropylene | Phillips Petroleum |
| Polysulfones | Amoco Performance Products |
| Polyvinyl Chlorides | B.F. Goodrich |
| Styrene Acrylonitriles | Dow Chemical |
| Polystyrenes | Mobil |
| Polyphenylene Ether Blends | Borg Warner Chemicals |
| Styrene Maleic anhydrides | Arco Chemical Company |
| Polycarbonates | General Electric Company |

TABLE 35

Thermosets Materials that can be used in the composites of the present invention

| | |
|---|---|
| Allyls | Osaka Soda Company |
| Aminos | American Cyanamid |
| Cyanates | Dow Chemical |
| Epoxies | Bisphenol A type epoxies and acrylkate modified epoxies with aliphatic and aromatic amine curing agents, Ciba Geigy and Shell |
| Phenolics | Resole and Novalacs Occidental Chemical |
| Unsaturated Polyesters | Ashland Chemical |
| Bismaleimides | Ciba Geigy |
| Polyurethanes | Polyether and Polyester polyurethanes |
| Silicones | Dow Corning Corporation |
| Vinyl Esters | Ashland Chemical Corporation |
| Urethane Hybrids | Urethane Acrylates and urethane epoxies |

A specific example of using Tungsten powder with a thermosetting Epoxy is as follows. 27.7 grams of Tungsten powder was weighed in a beaker and set aside. Subsequently 5.0 grams of Epon 8111 of an acrylate modified epoxy was weighed into another container to which was immediately added 0.5 grams of Shell Epi-Cure 3271. Then 3.6 grams of the mixed epoxy and curing agent was added to the 27.7 grams of Teledyne C-8 Tungsten powder. The powder and the epoxy were hand mixed, placed between two Teflon sheets and allowed to cure overnight. A flexible sample of Tungsten powder epoxy was produced.

Foam

A polyurethane rigid foam can also be produced using the compositions of the present invention. The foam was produced by adding 238 grams of Teledyne C8 Tungsten powder to 109.9 grams of Premium Polymer 475–20 B component and the mixture was stirred. Next 12® grams of Premium Polymer 475–20 A component was added and the slurry stirred for approximately twenty seconds. The slurry was placed in a container. It quickly rose and was tack free within two minutes. The tungsten powder was uniformly distributed throughout the foam. It is envisioned that the foam material may be employed in a binder capacity as defined elsewhere herein. The high density foam will find utility in noise and vibration damping, in radiation shielding and the like.

Slurry

In certain other embodiments, the compositions of the present invention may be employed to produce a high density, low viscosity slurry. Such a slurry may be employed in list systems of deep submerge rescue vessels or remote operated vehicles, in a manner similar to the current uses of mercury therein.

In present systems mercury is transferred between spherical chambers to cause list to port or starboard or to change the distance between the center of buoyancy and the center of gravity. The list system of such vessels involves the transfer of approximately 2800 pounds of mercury between a reservoir which is low and centered athwart ships and the port and starboard wing tanks which are located 45° above the horizontal and as far outboard as possible. All the tanks are spherical and equipped with a diaphragm, which is actuated by hydraulic fluid to displace the mercury. The spherical tanks are located between and in close proximity to the center and aft personnel spheres, the skin and the structural rings that serve as the aft support for the personnel pressure capsule. The tanks are connected by 1.25 inch outside diameter stainless steel tubing and the mercury can be transferred between the reservoir and a wing tank in 45 seconds representing a flow of about 25 gpm.

When such systems were designed, mercury was thought to be the ideal fluid for such weight modulation, however, the toxic nature of mercury makes it an extremely hazardous material for this purpose. Hence an alternative is needed. U.S. Pat. No. 5,349,915 (incorporated herein by reference) describes tungsten balls in a tube of hydraulic fluid as a weight medium for deep submersibles.

The compositions of the present invention provide a high density composite material that may be used as a weight medium for trim and list systems. Such compositions may be configured into a high density slurry comprising solvents, suspension agents, surfactants and lubricants. The high density material of the present invention may be in the form of high density balls or in the form of a powder mixture in the slurry.

The solvent of choice may be a perfluorpolyether, other examples include castor oils, tricresyl phosphate, polyoxypropylene ether glycols, polymethylphenyl siloxane, fluorosilicone, paratherm NF, therminol, dynalene, tribolube F-219, perfluorinated hydrocarbons, fomalin 1818 perfluorpolyether, Voranol 5070 perfluorpolyether, Voranol perfluorpolyether 5004, and Veranol perfluorpolyether 2004. These fluids exhibit good viscosity, compatibility, and volatility and are compatible-with stainless steel, tungsten, Teflon, synthetic rubber and Viton.

The surfactant of choice may be anionic, cationic or nonanionic in nature. Silicon and fluorosilicone surfactants may also be employed. The tungsten composites of the present invention may be in powder form or in the form a balls. Polymeric encapsulation may be employed with the tungsten powder or balls to reduce friction in the slurry. Urea-formaldehyde emulsions, glyco diols and melamine formaldehyde compositions are good candidates as encapsulations materials.

In an exemplary slurry 700 g tungsten powder (2–4 micron) are mixed with 100 g 60 wt. motor oil (specific gravity 1.1) and 800 g ballast material 1 (specific gravity 6.3). In another embodiment, 350 g tungsten powder (8–10 microns) are blend with 50 g 80–140 wt. gear case oil (specific gravity 1.1), and 400 g of ballast material 2 ® specific gravity 6.3).

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the composition, methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention.

REFERENCES

The following references, to the extent that they provide exemplary procedural or other details supplementary to those set forth herein, are specifically incorporated herein by reference.

U.S. Pat. No. 5, 189,252
PCT Application No. WO 92/08346
U.S. Pat. No. 5,081,786
U.S. Pat. No. 3,546,769
U.S. Pat. No. 4,428,295
U.S. Pat. No. 5,399,187
Shooting Sportsman, July/August 1995, pp. 9–12
U.K. Patent Application No. GB 2179664A

What is claimed is:

1. A method for manufacturing a high density composite, comprising the steps of:
   providing a polymeric binder;
   providing tungsten powder, wherein the tungsten powder further comprises a first group of particles having sizes of between about 2 microns and about 8 microns; and a second group of particles having sizes of between about 20 microns and 40 microns;
   mixing the tungsten powder with the polymeric binder at approximately the melting point of the polymeric binder into a tungsten powder/polymeric binder mixture; and
   pelletizing the tungsten powder/polymeric binder mixture into a composition.

2. A method for manufacturing a high density composite, comprising the steps of:
   providing a binder;
   providing tungsten powder, wherein the tungsten powder comprises a first group of particles having sizes in a first range, a second group of particles having sizes in a second range, and a third group of particles having sizes in a third range;
   mixing the tungsten powder with the binder at approximately the melting point of the binder into a tungsten powder/binder mixture; and
   pelletizing the tungsten powder/binder mixture into a composition.

3. The method of claim 1 further including the steps of:
   molding the tungsten powder/polymeric binder mixture into a composition having a specific gravity of at least 11.0.

4. The method of claim 3 wherein the step of molding comprises injection molding.

5. The method of claim 1, wherein the first group of particles further comprises:
   a third group of particles having sizes of between about 2 microns and about 4 microns; and
   a fourth group of particles having sizes of between about 4 microns and about 8 microns.

6. The method according to claim 3, wherein the polymeric binder comprises at least one of cellulose, fluoropolymer, ethylene inter-polymer alloy elastomer, ethylene vinyl acetate, ionomer, nylon, polyether imide, polyamide, polyurethane, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyimides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, or urethane hybrids.

7. The method of claim 1, wherein the step of providing a polymeric binder further comprises the steps of:
   freezing the polymeric binder; and
   grinding the frozen polymeric binder into particles.

8. The method of claim 3, wherein the step of molding further comprises the steps of:
   molding the tungsten powder/polymeric binder mixture into a projectile having a specific gravity of at least 11.0.

9. The method of claim 8, wherein the step of molding further comprises the steps of:
   molding the tungsten powder/polymeric binder mixture into shot having a specific gravity of at least 11.0.

* * * * *